(12) United States Patent
Steinbach et al.

(10) Patent No.: US 11,990,626 B2
(45) Date of Patent: May 21, 2024

(54) CATALYST

(71) Applicant: 3M INNOVATIVE PROPERTIES COMPANY, St. Paul, MN (US)

(72) Inventors: Andrew J. L. Steinbach, Shoreview, MN (US); Andrew T. Haug, Woodbury, MN (US); Krzysztof A. Lewinski, Mahtomedi, MN (US); Amy E. Hester, Hudson, WI (US); Grant M. Thoma, Woodbury, MN (US); Cedric Bedoya, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 891 days.

(21) Appl. No.: 15/733,735

(22) PCT Filed: Apr. 11, 2019

(86) PCT No.: PCT/IB2019/053006
§ 371 (c)(1),
(2) Date: Oct. 9, 2020

(87) PCT Pub. No.: WO2019/198033
PCT Pub. Date: Oct. 17, 2019

(65) Prior Publication Data
US 2021/0408555 A1     Dec. 30, 2021

Related U.S. Application Data

(60) Provisional application No. 62/657,184, filed on Apr. 13, 2018.

(51) Int. Cl.
*H01M 4/92* (2006.01)
*B01J 23/42* (2006.01)
(Continued)

(52) U.S. Cl.
CPC .... *H01M 4/921* (2013.01); *H01M 2008/1095* (2013.01)

(58) Field of Classification Search
CPC ........ H01M 4/92; H01M 4/921; H01M 4/925; B01J 23/42; B01J 23/468
See application file for complete search history.

(56) References Cited

U.S. PATENT DOCUMENTS

| 4,340,276 A | 7/1982 | Maffitt |
| 4,447,506 A | 5/1984 | Luczak |

(Continued)

FOREIGN PATENT DOCUMENTS

| CN | 102820475 | 2/2016 |
| EP | 2959968 | 12/2015 |

(Continued)

OTHER PUBLICATIONS

Zhang et al., "Fuel Cells, Principles, Key Materials and Technologies", Shanghai Jiao Tong University Press, Dec. 31, 2014, pp. 1-26.
(Continued)

*Primary Examiner* — Matthew E. Hoban

(57) ABSTRACT

Catalyst comprising an Ir layer having an outer layer with a layer comprising Pt directly thereon, wherein the Ir layer has an average thickness in a range from 0.04 to 30 nanometers, wherein the layer comprising Pt has an average thickness in a range from 0.04 to 50 nanometers, and wherein the Pt and Ir are present in an atomic ratio in a range from 0.01:1 to 10:1. Catalysts described herein are useful, for example, in fuel cell membrane electrode assemblies.

12 Claims, 15 Drawing Sheets

(51) Int. Cl.
*B01J 23/46* (2006.01)
*H01M 8/10* (2016.01)

(56) References Cited

U.S. PATENT DOCUMENTS

| | | | |
|---|---|---|---|
| 4,568,598 | A | 2/1986 | Bilkadi |
| 4,812,352 | A | 3/1989 | Debe |
| 5,039,561 | A | 8/1991 | Debe |
| 5,068,161 | A | 11/1991 | Keck |
| 5,183,713 | A | 2/1993 | Kunz |
| 5,338,430 | A | 8/1994 | Parsonage |
| 5,759,944 | A | 6/1998 | Buchanan |
| 5,879,827 | A | 3/1999 | Debe |
| 5,879,828 | A | 3/1999 | Debe |
| 6,040,077 | A | 3/2000 | Debe |
| 6,136,412 | A | 10/2000 | Spiewak |
| 6,319,293 | B1 | 11/2001 | Debe |
| 6,805,972 | B2 | 10/2004 | Erlebacher |
| 7,419,741 | B2 | 9/2008 | Vernstrom |
| 7,901,829 | B2 | 3/2011 | Debe |
| 8,211,825 | B2 | 7/2012 | Mei |
| 8,673,773 | B2 | 3/2014 | Opperman |
| 8,748,330 | B2 | 6/2014 | Debe |
| 8,895,206 | B2 | 11/2014 | Erlebacher |
| 2002/0004453 | A1 | 1/2002 | Haugen |
| 2004/0048466 | A1 | 3/2004 | Gore |
| 2005/0053826 | A1 | 3/2005 | Wang |
| 2010/0047668 | A1 | 2/2010 | Steinbach |
| 2014/0246304 | A1 | 9/2014 | Debe |
| 2015/0093685 | A1 | 4/2015 | Yang |
| 2015/0311536 | A1 | 10/2015 | Atanasoska |
| 2015/0380758 | A1 | 12/2015 | Ball |
| 2016/0079604 | A1 | 3/2016 | Atanasoski |
| 2018/0062181 | A1 | 3/2018 | Gath |

FOREIGN PATENT DOCUMENTS

| | | |
|---|---|---|
| EP | 2954579 | 4/2018 |
| EP | 2843066 | 8/2019 |
| JP | H03-236160 | 10/1991 |
| JP | H06-132034 | 5/1994 |
| JP | 2010-280974 | 12/2010 |
| JP | 2011-014475 | 1/2011 |
| WO | WO 2001-048839 | 7/2001 |
| WO | WO 2008-025750 | 3/2008 |
| WO | WO 2009-135189 | 11/2009 |
| WO | WO 2010-092369 | 8/2010 |
| WO | WO 2010-138138 | 12/2010 |
| WO | WO 2012-017226 | 2/2012 |
| WO | WO 2012-107738 | 8/2012 |
| WO | WO 2013-055533 | 4/2013 |
| WO | WO2013055533 | * 4/2013 |
| WO | WO 2014-099790 | 6/2014 |
| WO | WO 2014-122426 | 8/2014 |
| WO | WO 2014-122427 | 8/2014 |
| WO | WO 2016-100034 | 6/2016 |
| WO | WO 2016-191057 | 12/2016 |
| WO | WO 2018-080791 | 5/2018 |
| WO | WO 2019-193458 | 10/2019 |
| WO | WO 2019-193460 | 10/2019 |
| WO | WO 2019-193461 | 10/2019 |
| WO | WO 2019-195046 | 10/2019 |
| WO | WO 2019-198029 | 10/2019 |
| WO | WO 2019-198031 | 10/2019 |

OTHER PUBLICATIONS

Artem, "Development of Ternary and Quaternary Catalysts for The Electrooxidation of Glycerol", The Scientific World Journal, 2012, vol. 2012, Article ID 502083, 6 pages.

Arun, "Electrochemical Characterization of Pt—Ru—Ni/C Anode Electrocatalyst for Methanol Electrooxidation in Membraneless Fuel Cells," RSC Advances, Jun. 2015, vol. 5, pp. 49643-49650.

Cheng, "Enhanced Activity and Stability of Core-Shell Structured PtRuNi$_x$ Electrocatalysts for Direct Methanol Fuel Cells," International Journal of Hydrogen Energy, Jan. 2016, vol. 41, No. 3, pp. 1935-1943.

Chessin, "Paramagnetic Susceptibility, Electrical Resistivity, and Lattice Parameters of Nickel-Rich Nickel-Tantalum Alloys," Journal of Applied Physics, Aug. 1964, vol. 35 No. 8, pp. 2419-2423.

Choi, "Methanol Oxidation on Pt/Ru, Pt/Ni, and Pt/Ru/Ni Anode Electrocatalysts at Different Temperatures for DMFCs" Journal of the Electrochemical Society, 2003, vol. 150, No. 7, pp. A973-A978.

Chow, "Fabrication of Biologically Based Microstructure Composites for Vacuum Field Emission", Materials Science and Engineering A, Oct. 1992, vol. 158, No. 1, pp. 1-6.

Clancey, "Atomic Layer Deposition of Ultrathin Platinum Films on Tungsten Atomic Layer Deposition Adhesion Layers: Application to High Surface Area Substrates," Journal of Vacuum Science and Technology, Part A, Jan. 1901, vol. 33, No. 1, 9 pages.

Cooper, "Combinatorial screening of fuel cell cathode catalyst compositions", Applied Surface Science, 254, 2007, pp. 662-668.

Debe, "Effect of Gravity on Copper Phthalocyanine Thin Films III: Microstructure Comparisons of Copper Phthalocyanine Thin Films Grown in Microgravity and Unit Gravity", Thin Solid Films, 186, 1990, pp. 327-347.

Debe, "Vacuum Vapor Deposited Thin Films of a Perylene Dicarboxide Derivative: Microstructure Versus Deposition Parameters", Journal of Vacuum Science & Technology A, vol. 6, No. 3, May/Jun. 1988, pp. 1907-1911.

Edwards, "Basic Materials Physics of Transparent Conducting Oxides," Dalton Transactions, 2004, vol. 19, pp. 2995-3002.

Erlebacher, "Evolution of Nanoporosity in Dealloying", Letters to Nature, Mar. 2001, vol. 410, pp. 450-453.

Gerstenberg "Effects of Nitrogen, Methane, and Oxygen on Structure and Electrical Properties of Thin Tantalum Films," Journal of Applied Physics, Feb. 1964, vol. 35, No. 2, pp. 402-407.

Hitosugi, Ta-doped Anatase TiO2 Epitaxial Film as Transparent Conducting Oxide, Japanese Journal of Applied Physics, 2005, vol. 44, No. 34, pp. L1063-L1065.

Hu, "A Facile and Surfactant-Free Route for Nanomanufacturing of Tailored Ternary Nanoalloys as Superior Oxygen Reduction Reaction Electrocatalysts", Catalysis Science & Technology, Apr. 2017, vol. 7. No. 10, pp. 2074-2086.

Ioroi, "Platinum-Iridium Alloys as Oxygen Reduction Electrocatalysts for Polymer Electrolyte Fuel Cells", Journal of The Electrochemical Society, 2005, vol. 152, No. 10, pp. A1917-A1924.

Johnson, "In Situ Reactivity and TOF-SIMS Analysis of Surfaces Prepared by Soft and Reactive Landing of Mass-Selected Ions", Analytical Chemistry, 2010, vol. 82, No. 13, pp. 5718-5727.

Johnson, "Preparation of Surface Organometallic Catalysts by Gas-Phase Ligand Stripping and Reactive Landing of Mass-Selected Ions", Chemistry: A European Journal, 2010, vol. 16, No. 48, pp. 14433-14438.

Ju, Electrical Properties of Amorphous Titanium Oxide Thin Films for Bolometric Application, Advances in Condensed Matter Physics, Nov. 2013, Article ID 365475, 5 pages.

Kam "Summary Abstract: Dramatic Variation of the Physical Microstructure of a Vapor Deposited Organic Thin Film", Journal of Vacuum Science & Technology A, vol. 5, No. 4, Jul./Aug. 1987, pp. 1914-1916.

Kim, "High-Performance Quaternary PtRuIrNi Electrocatalysts with Hierarchical Nanostructured Carbon Support," Journal of Catalysis, Oct. 2013, vol. 306, pp. 133-145.

Lee, "Measurement and Modeling of the Reflectance-Reducing Properties of Gradient Index Microstructured Surfaces", Photographic Science and Engineering, vol. 24, No. 4, Jul./Aug. 1980, pp. 211-216.

Lewinski, "NSTF Advances for PEM Electrolysis—the Effect of Alloying on Activity of NSTF Electrolyzer Catalysts and Performance of NSTF Based PEM Electrolyzers", ECS Transactions, Oct. 2015, vol. 69, No. 17, pp. 893-917.

Li, "Preparation and Electrochemical Research of Anode Catalyst PtRuNi/C for Direct Methanol Fuel Cell," Journal of Biobased Materials and Bioenergy, Aug. 2013, vol. 7, No. 4, pp. 525-528.

(56) References Cited

OTHER PUBLICATIONS

Liang, "Synthesis and Structure-Activity Relationship Exploration of Carbon-Supported PtRuNi Nanocomposite as a CO-Tolerant Electrocatalyst for Proton Exchange Membrane Fuel Cells", Journal of Physical Chemistry B, Mar. 2006, vol. 110, No. 15, pp. 7828-7834.
Liu, "Methanol Oxidation on Carbon-Supported Pt—Ru—Ni Ternary Nanoparticle Electrocatalysts," Journal of Power Sources, Jan. 2008, vol. 175, No. 1, pp. 159-165.
Liu, "Segmented Pt/Ru, Pt/Ni, and Pt/RuNi Nanorods as Model Bifunctional Catalysts for Methanol Oxidation," Small, Jan. 2006, vol. 2, No. 1, pp. 121-128.
Liu, "RDE Measurements of ORR Activity of $Pt_1$-x $Ir_x$ (0 < x 0.3) on High Surface Area NSTF-Coated Glassy Carbon Disks," Journal of the Electrochemical Society, 2010, vol. 157, No. 2, pp. B207-B214.
Mani, "Dealloyed Binary $PtM_3$ (M=Cu. Co, Ni) and Ternary PtNi3M (M=Cu, Co, Fe, Cr) Electrocatalysts for the Oxygen Reduction Reaction: Performance in Polymer Electrolyte Membrane fuel Cells", Journal of Power Sources, Jan. 2011, vol. 196, No. 2, pp. 666-673.
Martinez-Huerta, "Effect of Ni Addition Over PtRu/C Based Electrocatalysts for Fuel Cell Applications," Applied Catalysis B: Environmental, Dec. 2006, vol. 69, No. 1-2, pp. 75-84.
Moreno, "Synthesis of the Ceramic-Metal Catalysts (PtRuNi—TiO2) by the Combustion Method," Journal of Power Sources, Jun. 2007, vol. 169, No. 1, pp. 98-102.
Nan, "A Core-Shell $Pd_1Ru_1Ni_2$@Pt/C Catalyst with a Ternary Alloy Core and Pt Monolayer: Enhanced Activity and Stability Towards the Oxygen Reduction Reaction by the Addition of Ni," Journal of Materials Chemistry A, 2016, vol. 4, No. 3, pp. 847-855.
Ohnuma, "Amorphous Ultrafine Metallic Particles Prepared By Sputtering Method", Rapidly Quenched Metals, (Proc. of the Fifth Int. Conf. on Rapidly Quenched Metals, Wurzburg, Germany, Sep. 3-7, 1984), S. Steeb et al., eds., Elsevier Science Publishers B. V., New York, (1985), pp. 1117-1124.
Palma, "Development of Plurimetallic Electrocatalysts Prepared by Decomposition of Polymeric Precursors for $EtOH/O_2$ Fuel Cell," Journal of the Brazilian Chemical Society, Mar. 2012, vol. 23, No. 3, pp. 555-564.
Palma, "Ethanol Electrooxidation by Plurimetallic Pt-Based Electrocatalysts Prepared by Microwave Assisted Heating," Journal of the Electrochemical Society, Feb. 2014, vol. 161, No. 4, pp. F473-F479.
Papaderakis, "Ternary Pt—Ru—Ni Catalytic Layers for Methanol Electrooxidation Prepared by Electrodeposition and Galvanic Replacement," Frontiers in Chemistry, Jun. 2014, vol. 2, Art. 29, pp. 1-11.
Park, "Chemical and Electronic Effects of Ni in Pt/Ni and Pt/Ru/Ni Alloy Nanoparticles in Methanol Electrooxidation," Journal of Physical Chemistry B, Feb. 2002, vol. 106, No. 8, pp. 1869-1877.
Paul, "Electrochemical Oxidation of Ethanol on Thin Coating of Platinum-Based Material on Nickel Support," Indian Journal of Chemistry, May 2006, vol. 45, pp. 1144-1152.
Pierson, "Handbook of Refractory Carbides and Nitrides", 1996, pp. 1-7.
Ribadeneira, "Co-Catalytic Effect of Nickel in Pt—Ru/C and Pt—Sn/C Electrocatalysts For Ethanol Electrooxidation," Latin American Applied Research, Apr. 2010, vol. 40, No. 2, pp. 113-118.
Sadaoka, "Effects of Morphology on NO2 Detection in Air at Room Temperature with Phthalocyanine Thin Films", Journal of Material Science, vol. 25, 1990, pp. 5257-5268.
Scott, "The Journal of the Institute of Metals", 1919, vol. XXI, p. 441.
Shao, "Evaluation of the Performance of Carbon Supported Pt—Ru—Ni—P as Anode Catalyst for Methanol Electrooxidation," Fuel Cells, 2010, vol. 10, No. 3, pp. 472-477.
Shen, "Comparison Study of Few-Layered Graphene Supported Platinum and Platinum Alloys for Methanol and Ethanol Electro-Oxidation," Journal of Power Sources, Mar. 2015, vol. 278, pp. 235-244.
Sheng, "TiC Supported Pt—Ir Electrocatalyst Prepared by Plasma Process for The Oxygen Electrode in Unitized Regenerative Fuel Cells," Journal of Power Sources, 2011, vol. 196, No. 13, pp. 5416-5422.
Shui, Evolution of Nanoporous Pt—Fe Alloy Nanowires by Dealloying and their Catalytic Property for Oxygen Reduction Reaction, Advanced Functional Materials, Sep. 2011, vol. 21, No. 17, pp. 3357-3362.
Sudachom, "One Step $NaBH_4$ Reduction of Pt—Ru—Ni Catalysts on Different Types of Carbon Supports for Direct Ethanol Fuel Cells: Synthesis and Characterization," Journal of Fuel Chemistry and Technology, May 2017, vol. 45, No. 5, pp. 596-607.
Sun, "Ternary PtRuNi Nanocatalysts Supported on N-Doped Carbon Nanotubes: Deposition Process, Material Characterization, and Electrochemistry," Journal of the Electrochemical Society, Aug. 2009, vol. 156, No. 10, pp. B1249-B1252.
Tang, "High dispersion and electrocatalytic properties of platinum on well-aligned carbon nanotube arrays", Carbon, 2004, vol. 42, pp. 191-197.
Vliet, "Mesostructured thin films as electrocatalysts with tunable composition and surface morphology", Nature Materials, Nov. 2012, vol. 11, No. 12, pp. 1051-1058.
Wang, "Structurally ordered intermetallic platinum-cobalt core-shell nanoparticles with enhanced activity and stability as oxygen reduction electrocatalysts", Nature Materials, Jan. 2013, vol. 12, No. 1, pp. 81-87.
Wang, "An Advantageous Method for Methanol Oxidation: Design and Fabrication of a Nanoporous PtRuNi Trimetallic Electrocatalyst," Journal of Power Sources, Nov. 2011, vol. 196, No. 22, pp. 9346-9351.
Wang, "Effect of a Carbon Support Containing Large Mesopores on the Performance of a Pt—Ru—Ni/C Catalyst for Direct Methanol Fuel Cells," Journal of Physical Chemistry C, 2010, vol. 114, No. 1, pp. 672-677.
Wang, "Effect of Annealing Heat Treatment on Stability of Pt—Ru—Ni/C Catalyst for Direct Methanol Fuel Cell," Chinese Journal of Power Sources, Feb. 2009, Abstract only.
Wang, "Effect of Ni on PtRu/C Catalyst Performance for Ethanol Electrooxidation in Acidic Medium," Journal of Physical Chemistry C, 2008, vol. 112, No. 16, pp. 6582-6587.
Wang, "Electrochemical Impedance Studies on Carbon Supported PtRuNi and PtRu Anode Catalysts in Acid Medium for Direct Methanol Fuel Cell," Journal of Power Sources, Feb. 2007, vol. 165, No. 1, pp. 9-15.
Woo, "Electrocatalytic Characteristics of Pt—Ru—Co and Pt—Ru—Ni Based on Covalently Cross-Linked Sulfonated Poly (ether ether ketone)/Heteropolyacids Composite Membranes for Water Electrolysis", Journal of Industrial and Engineering Chemistry, Sep. 2010, vol. 16, No. 5, pp. 688-697.
Yang, "Truncated Octahedral Platinum-Nickel-Iridium Ternary Electrocatalyst for Oxygen Reduction Reaction", Journal of Power Sources, 2015, vol. 291, pp. 201-208.
Ye, "Carbon Nanotubes Supported Pt—Ru—Ni as Methanol Electro-Oxidation Catalyst for Direct Methanol Fuel Cells," Journal of Natural Gas Chemistry, Jun. 2007, vol. 16, No. 2, pp. 162-166.
Yousaf, "Method to Prepare Ternary Methanol Electro-Oxidation Catalysts for Direct Methanol Fuel Cell Applications" Journal of The Electrochemical Society, Apr. 2017, vol. 164, No. 6, pp. 667-673.
Zhang, "Preparation of Pt—Ru—Ni Ternary Nanoparticles by Microemulsion and Electrocatalytic Activity for Methanol Oxidation," Materials Research Bulletin, Feb. 2007, vol. 42, No. 2, pp. 327-333.
Zhao, "Electrodeposition of Pt—Ru and Pt—Ru—Ni Nanoclusters on Multi-Walled Carbon Nanotubes for Direct Methanol Fuel Cell," International Journal of Hydrogen Energy, Mar. 2014, vol. 39, No. 9, pp. 4544-4557.
International Search Report for PCT International Application No. PCT/IB2019/053006, mailed on Jul. 12, 2019, 4 pages.

* cited by examiner

CATALYST

CROSS REFERENCE TO RELATED APPLICATIONS

This application is a national stage filing under 35 U.S.C. 371 of PCT/IB2019/053006, filed Apr. 11, 2019, which claims the benefit of U.S. Provisional Patent Application No. 62/657,184, filed Apr. 13, 2018, the disclosure of which is incorporated by reference herein in its entirety.

This invention was made with Government support under Contract No. DE-EE0007270 awarded by DOE. The Government has certain rights in this invention.

BACKGROUND

Fuel cells produce electricity via electrochemical oxidation of a fuel and reduction of an oxidant. Fuel cells are generally classified by the type of electrolyte and the type of fuel and oxidant reactants. One type of fuel cell is a polymer electrolyte membrane fuel cell (PEMFC), where the electrolyte is a polymeric ion conductor and the reactants are hydrogen fuel and oxygen as the oxidant. The oxygen is often provided from the ambient air.

PEMFCs typically require the use of electrocatalysts to improve the reaction rate of the hydrogen oxidation reaction (HOR) and oxygen reduction reactions (ORR), which improve the PEMFC performance. PEMFC electrocatalysts often comprise platinum, a relatively expensive precious metal. It is typically desirable to minimize the platinum content in PEMFC increasing the catalyst activity per unit catalyst surface area (specific activity) and increasing the catalyst surface area per catalyst mass (specific surface area or specific area). The HOR and ORR occur on the catalyst surface, so increasing the specific surface area and/or the specific activity can reduce the devices to minimize cost. Sufficient platinum content, however, is needed to provide sufficient catalytic activity and PEMFC device performance. As such, there is a desire to increase the catalyst activity per unit catalyst mass (mass activity). There are two general approaches to increase the mass activity, namely amount of catalyst needed to achieve a desired absolute performance, reducing cost.

To maximize specific area, PEMFC electrocatalysts are often in the form of nanometer-scale thin films or particles on support materials. An exemplary support material for nanoparticle PEMFC electrocatalysts is carbon black, and an exemplary support material for thin film electrocatalysts is whiskers.

To increase the specific activity, PEMFC Pt ORR electrocatalysts often also comprise certain transition metals such as cobalt or nickel. Without being bound by theory, incorporation of certain transition metals into the Pt lattice is believed to induce contraction of the Pt atoms at the catalyst surface, which increases the kinetic reaction rate by modification of the molecular oxygen binding and dissociation energies and the binding energies of reaction intermediates and/or spectator species.

PEMFC electrocatalysts may incorporate other precious metals. For example, HOR PEMFC Pt electrocatalysts can be alloyed with ruthenium to improve tolerance to carbon monoxide, a known Pt catalyst poison. HOR and ORR PEMFC electrocatalysts may also incorporate iridium to facilitate improved activity for the oxygen evolution reaction (OER). Improved OER activity may improve the durability of the PEMFC under inadvertent operation in the absence of fuel and during PEMFC system startup and shutdown. Incorporation of iridium with the PEMFC ORR electrocatalyst, however, may result in decreased mass activity and higher catalyst cost. Iridium has relatively lower specific activity for ORR than platinum, potentially resulting in decreased catalyst mass activity. Iridium is also a precious metal, and thereby its incorporation can increase cost. PEMFC Pt electrocatalysts may also incorporate gold which is also a precious metal and can increase cost. Gold is known to be relatively inactive for HOR and ORR in acidic electrolytes. Incorporation of gold can result in substantial deactivation for HOR and ORR due to the propensity for gold to preferentially segregate to the electrocatalyst surface, blocking active catalytic sites.

PEMFC electrocatalysts may have different structural and compositional morphologies. The structural and compositional morphologies are often tailored through specific processing methods during the electrocatalyst fabrication, such as variations in the electrocatalyst deposition method and annealing methods. PEMFC electrocatalysts can be compositionally homogenous, compositionally layered, or may contain composition gradients throughout the electrocatalyst. Tailoring of composition profiles within the electrocatalyst may improve the activity and durability of electrocatalysts. PEMFC electrocatalyst particles or nanometer-scale films may have substantially smooth surfaces or have atomic or nanometer scale roughness. PEMFC electrocatalysts may be structurally homogenous or may be nanoporous, being comprised of nanometer-scale pores and solid catalyst ligaments.

In PEMFC devices, electrocatalysts may lose performance over time due to a variety of degradation mechanisms, which induce structural and compositional changes. Such performance loss may shorten the practical lifetime of such systems. Electrocatalyst degradation may occur, for example, due to loss of electrocatalyst activity per unit surface area and loss of electrocatalyst surface area. Electrocatalyst specific activity may be lost, for example, due to the dissolution of electrocatalyst alloying elements. Nanoparticle and nano-scale thin film electrocatalysts may lose surface area, for example, due to Pt dissolution, particle sintering, agglomeration, and loss of surface roughness.

Additional electrocatalysts and systems containing such catalysts are desired, including those that address one or more of the issues discussed above.

SUMMARY

In one aspect, the present disclosure provides a catalyst comprising an Ir layer, the Ir layer having an outer layer with a layer comprising Pt directly thereon, wherein the Ir layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, 0.05 to 1.64, 0.05 to 1, 0.05 to 0.98, 0.05 to 0.39, 0.05 to 0.36, or even 0.8 0.85) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2.99, 0.04 to 2.5, 0.04 to 2, 0.04 to 1.57, 0.04 to 1, 0.04 to 0.71, 0.04 to 0.34, or even in a range from 0.04 to 0.31) nanometers, wherein the Pt and Ir are present in an atomic ratio in a range from 0.01:1 to 10:1 (in some embodiments, in a range from 0.04:1 to 2.85:1, 0.35:1 to 1.79:1, 0.72:1 to 1.18:1, 0.19:1 to 5.90:1, 0.31:1 to 5.90:1, 0.76:1 to 1.88:1, or in a range from even 0.85:1 to 3.87:1). In some embodiments, the catalyst surface area is at least 5 (in some embodiments, at least 6, 7, 8, 9, 10, 11, 12, 13, 14, 15, 20, 25, 30, 35, 40, 45, or even at least 49) percent greater than would be present without the presence of the Ir layer.

In another aspect, the present disclosure provides a method of making catalyst described herein, the method comprising depositing any of the layers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition. In some embodiments, the method further comprises annealing at least one of the layers.

In another aspect, the present disclosure provides an article comprising nanostructured elements comprising microstructured whiskers having an outer surface having catalyst described herein thereon. In some embodiments of the articles, the first layer is directly on the microstructured whiskers.

In another aspect, the present disclosure provides a method of making an article described herein, the method comprising depositing any of the layers onto microstructured whiskers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition. In some embodiments, the method further comprises annealing at least one of the layers.

In another aspect, the present disclosure provides a method for making catalyst of described herein, the method comprising electrochemically cycling the catalyst.

Surprisingly, incorporation of a layer of Ir beneath a layer of ORR electrocatalyst can result in improved mass activity, specific surface area, durability, and fuel cell performance of the ORR electrocatalyst.

Catalysts described herein are useful, for example, in fuel cell membrane electrode assemblies.

DETAILED DESCRIPTION

Figure 1:
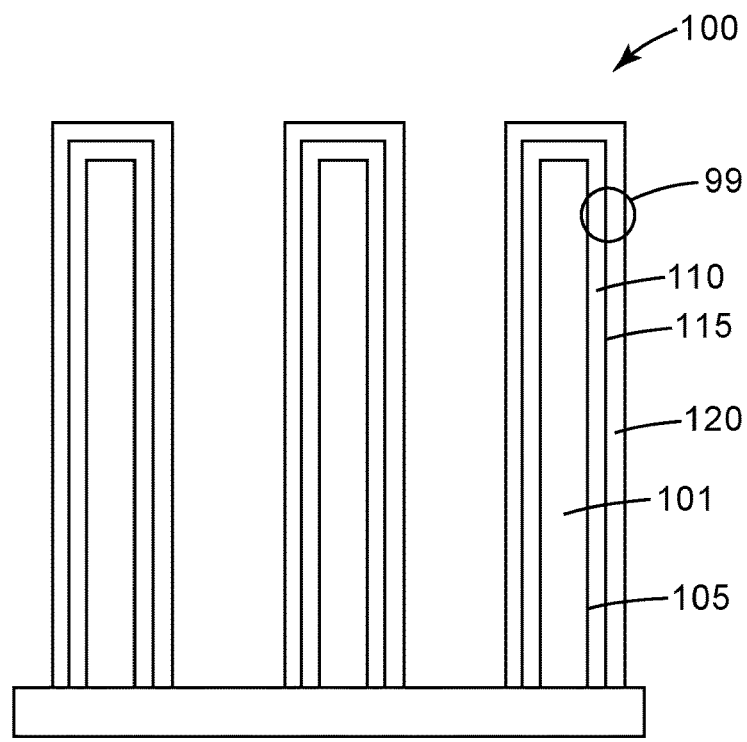
FIG. 1 is a side view of an exemplary catalyst described herein.

In some embodiments, the Ir layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, 0.05 to 1.64, 0.05 to 1, 0.05 to 0.98, 0.05 to 0.39, 0.05 to 0.36, or even 0.8 to 0.85) nanometers. In some embodiments, the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2.99, 0.04 to 2.5, 0.04 to 2, 0.04 to 1.57, 0.04 to 1, 0.04 to 0.71, 0.04 to 0.34, or even in a range from 0.04 to 0.31) nanometers.

In some embodiments, the Pt and Ir are present in an atomic ratio in a range from 0.01:1 to 10:1 (in some embodiments, in a range from 0.04:1 to 2.85:1, 0.35:1 to 1.79:1, 0.72:1 to 1.18:1, 0.19:1 to 5.90:1, 0.31:1 to 5.90:1, 0.76:1 to 1.88:1, or in a range from even 0.85:1 to 3.87:1).

In some embodiments, the catalyst surface area is at least 5 (in some embodiments, at least 6, 7, 8, 9, 10, 11, 12, 13, 14, 15, 20, 25, 30, 35, 40, 45, or even at least 49) percent greater than would be present without the presence of the Ir layer.

In some embodiments, the catalyst material further comprises at least one pair of alternating layers, wherein the first alternating layer comprises Ir, and wherein the second alternating layer comprises Pt.

In some embodiments, the catalyst further comprises nanoscopic metal crystallites extending from the surface of the catalyst. In some embodiments, the surface metal crystallites comprise at least 10 (in some embodiments, at least 15, 20, 25, 30, 40, 50, 60, 70, 75, 80, 90, 95, 98, 99, or even at least 99.9) atomic % Ir. In some embodiments, the surface metal crystallites have a length in a range from 0.25 to 10 (in some embodiments, in a range from 0.25 to 8, 0.25 to 6, 0.25 to 4, 25 to 3, 0.25 to 2, 0.25 to 1, 1 to 10, 1 to 8, 1 to 6, 1 to 4, 1 to 3, or even in a range from 1 to 2) nanometers. In some embodiments, the surface metal crystallites have lengths less than 8 (in some embodiments, less than 7, 6, 5, 4, 3, 2, or even less than 1) nanometers. In some embodiments, the surface metal crystallites have diameters in a range from 0.25 to 5 (in some embodiments, in a range from 0.25 to 4, 0.25 to 3, 0.25 to 2, 0.25 to 1, 1 to 5, 1 to 4, 1 to 3, or even in a range from 1 to 2) nanometers. In some embodiments, the surface metal crystallites have diameters less than 5 (in some embodiments, less than 4, 3, 2, or even a diameter less than 1) nanometers.

In some embodiments, the layer comprising Pt further comprises Ni. In some embodiments, the Pt to Ni atomic ratio is in a range from 0.5:1 to 5:1 (in some embodiments, in a range from 0.5:1 to 2:1, 0.5:1 to 1:1, 0.57:1 to 0.69:1, or even 0.58:1 to 0.62:1).

In some embodiments, the catalyst material comprises nanostructured elements comprising microstructured whiskers having an outer surface having an Ir layer thereon, the Ir layer having an outer layer with a layer comprising Pt directly thereon. In some embodiments, the Ir layer is directly on the microstructured whiskers. In some embodiments, the catalyst material further comprises at least one pair of alternating layers disposed between the outer surface of the microstructured whiskers and the layer comprising Ir, wherein the first alternating layer comprises Ir and is directly on the microstructured whiskers, and wherein the second alternating layer comprises Pt.

Referring to FIG. 1, exemplary catalyst described herein 99 comprises Ir layer 110 has outer layer 115 with layer 120 comprising Pt directly thereon (i.e., directly on outer layer 115). Ir layer 110 has an average thickness on the microstructured whiskers in a range from 0.04 to 30 nanometers. Layer 120 comprising Pt has an average thickness on microstructured whiskers 101 in a range from 0.04 to 50 nanometers. The Pt and Ir are present in an atomic ratio in a range from 0.01:1 to 10:1. As shown, optional nanostructured elements 100 comprises microstructured whiskers 101 having outer surface 105 with Ir layer 110 thereon (i.e., on outer surface 105).

In some embodiments, the microstructured whiskers are attached to a backing (e.g., a membrane). In some embodiments, wherein the backing has a microstructure on at least one of its surfaces.

Suitable whiskers can be provided by techniques known in the art, including those described in U.S. Pat. No. 4,812,352 (Debe), U.S. Pat. No. 5,039,561 (Debe), U.S. Pat. No. 5,338,430 (Parsonage et al.), U.S. Pat. No. 6,136,412 (Spiewak et al.), and U.S. Pat. No. 7,419,741 (Vernstrom et al.), the disclosures of which are incorporated herein by reference. In general, microstructured whiskers can be provided, for example, by vacuum depositing (e.g., by sublimation) a layer of organic or inorganic material onto a substrate (e.g., a microstructured catalyst transfer polymer sheet), and then, in the case of perylene red deposition, converting the perylene red pigment into microstructured whiskers by thermal annealing. Typically, the vacuum deposition steps are carried out at total pressures at or below about $10^{-3}$ Torr or 0.1 Pascal. Exemplary microstructures are made by thermal sublimation and vacuum annealing of the organic pigment C.I. Pigment Red 149 (i.e., N,N'-di(3,5-xylyl)perylene-3,4:9,10-bis(dicarboximide)). Methods for making organic micro structured layers are reported, for example, in Materials Science and Engineering, A158 (1992), pp. 1-6; J. Vac. Sci. Technol. A, 5, (4), July/August 1987, pp. 1914-16; J. Vac. Sci. Technol. A, 6, (3), May/August 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August 1980, pp. 211-16; and U.S. Pat. No. 4,340,276 (Maffitt et al.) and U.S. Pat. No. 4,568,598 (Bilkadi et al.), the disclosures of which are incorporated herein by reference. Properties of catalyst layers using carbon nanotube arrays are reported in the article "High Dispersion and Electrocatalytic Properties of Platinum on Well-Aligned Carbon Nanotube Arrays", Carbon, 42, (2004), pp. 191-197. Properties of catalyst layers using grassy or bristled silicon are reported, for example, in U.S. Pat. App. Pub. No. 2004/0048466 A1 (Gore et al.).

Vacuum deposition may be carried out in any suitable apparatus (see, e.g., U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S. Pat. No. 6,319,293 (Debe et al.), and U.S. Pat. App. Pub. No. 2002/0004453 A1 (Haugen et al.), the disclosures of which are incorporated herein by reference). One exemplary apparatus is depicted schematically in FIG. 4A of U.S. Pat. No. 5,338,430 (Parsonage et al.), and discussed in the accompanying text, wherein the substrate is mounted on a drum, which is then rotated over a sublimation or evaporation source for depositing the organic precursor (e.g., perylene red pigment) prior to annealing the organic precursor in order to form the whiskers.

Typically, the nominal thickness of deposited perylene red pigment is in a range from about 50 nm to 500 nm. Typically, the whiskers have an average cross-sectional dimension in a range from 20 nm to 60 nm, an average length in a range from 0.3 micrometer to 3 micrometers, and an areal number density in a range from 30 to 70 whiskers per square micrometer.

In some embodiments, the whiskers are attached to a backing. Exemplary backings comprise polyimide, nylon, metal foils, or other materials that can withstand the thermal annealing temperature up to 300° C. In some embodiments, the backing has an average thickness in a range from 25 micrometers to 125 micrometers.

In some embodiments, the backing has a microstructure on at least one of its surfaces. In some embodiments, the microstructure is comprised of substantially uniformly shaped and sized features at least three (in some embodiments, at least four, five, ten, or more) times the average size of the whiskers. The shapes of the microstructures can, for example, be V-shaped grooves and peaks (see, e.g., U.S. Pat. No. 6,136,412 (Spiewak et al.), the disclosure of which is incorporated herein by reference) or pyramids (see, e.g., U.S. Pat. No. 7,901,829 (Debe et al.), the disclosure of which is incorporated herein by reference). In some embodiments, some fraction of the microstructure features extends above the average or majority of the microstructured peaks in a periodic fashion, such as every $31^{st}$ V-groove peak being 25% or 50% or even 100% taller than those on either side of it. In some embodiments, this fraction of features that extends above the majority of the microstructured peaks can be up to 10% (in some embodiments up to 3%, 2%, or even up to 1%). Use of the occasional taller microstructure features may facilitate protecting the uniformly smaller microstructure peaks when the coated substrate moves over the surfaces of rollers in a roll-to-roll coating operation. The occasional taller feature touches the surface of the roller rather than the peaks of the smaller microstructures, so much less of the microstructured material or whisker material is likely to be scraped or otherwise disturbed as the substrate moves through the coating process. In some embodiments, the microstructure features are substantially smaller than half the thickness of the membrane that the catalyst will be transferred to in making a membrane electrode assembly. This is so that during the catalyst transfer process, the taller microstructure features do not penetrate through the membrane where they may overlap the electrode on the opposite side of the membrane. In some embodiments, the tallest microstructure features are less than $\frac{1}{3}^{rd}$ or $\frac{1}{4}^{th}$ of the membrane thickness. For the thinnest ion exchange membranes (e.g., about 10 micrometers to 15 micrometers in thickness), it may be desirable to have a substrate with microstructured features no larger than about 3 micrometers to 4.5 micrometers tall. The steepness of the sides of the V-shaped or other microstructured features or the included angles between adjacent features may, in some embodiments, be desirable to be on the order of 90° for ease in catalyst transfer during a lamination-transfer process and to have a gain in surface area of the electrode that comes from the square root of two (1.414) surface area of the microstructured layer relative to the planar geometric surface of the substrate backing.

In general, the catalyst can be deposited by techniques known in the art. Exemplary deposition techniques include those independently selected from the group consisting of sputtering (including reactive sputtering), atomic layer deposition, metal organic chemical vapor deposition, molecular beam epitaxy, thermal physical vapor deposition, vacuum deposition by electrospray ionization, and pulse laser deposition. Additional general details can be found, for example, in U.S. Pat. No. 5,879,827 (Debe et al.), U.S. Pat. No. 6,040,077 (Debe et al.), and U.S. Pat. No. 7,419,741 (Vernstrom et al.), the disclosures of which are incorporated herein by reference. The thermal physical vapor deposition method uses suitable elevated temperature (e.g., via resistive heating, electron beam gun, or laser) to melt or sublimate the target (source material) into a vapor state, which is in turn passed through a vacuum space, then condensing of the vaporized form onto substrate surfaces. Thermal physical vapor deposition equipment is known in the art, including that available, for example, as a metal evaporator or as an organic molecular evaporator from CreaPhys GmbH, Dresden, Germany, under the trade designations "METAL EVAPORATOR (ME-SERIES)" or "ORGANIC MOLECULAR EVAPORATOR (DE-SERIES)" respectively; another example of an organic materials evaporator is available from Mantis Deposition LTD, Oxfordshire, UK, under the trade designation "ORGANIC MATERIALS EVAPORATIOR (ORMA-SERIES)." Catalyst material comprising multiple alternating layers can be sputtered, for example, from multiple targets (e.g., Pt is sputtered from a first target, Ni is sputtered from a second target, and Ir from a third, or from a target(s) comprising more than one element (e.g., Pt and Ni)). If the catalyst coating is done with a single target, it may be desirable that the coating layer be applied in a single step onto the gas distribution layer, gas dispersion layer, catalyst transfer layer, or membrane, so that the heat of condensation of the catalyst coating heats the underlying catalyst or support Pt, Ni, or Ir atoms as applicable and substrate surface sufficient to provide enough surface mobility that the atoms are well mixed and form thermodynamically stable alloy domains. Alternatively, for example, the substrate can also be provided hot or heated to facilitate this atomic mobility. In some embodiments, sputtering is conducted at least in part in an atmosphere comprising argon. Organometallic forms of catalysts can be deposited, for example, by soft or reactive landing of mass selected ions. Soft landing of mass-selected ions is used to transfer catalytically-active metal complexes complete with organic ligands from the gas phase onto an inert surface. This method can be used to prepare materials with defined active sites and thus achieve molecular design of surfaces in a highly controlled way under either ambient or traditional vacuum conditions. For additional details see, for example, Johnson et al., Anal. Chem., 2010, 82, pp. 5718-5727, and Johnson et al., Chemistry: A European Journal, 2010, 16, pp. 14433-14438, the disclosures of which are incorporated herein by reference.

The planar equivalent thickness of an individual deposited catalyst layer is the thickness if deposited on a substantially flat, planar substrate. The planar equivalent thickness may depend, for example, on the areal catalyst loading of the layer and the catalyst density. For example, the planar equivalent thickness of a single layer of Pt with 10 micrograms of Pt per $cm^2$ planar area and density of 21.45 $g/cm^3$ deposited is calculated as 4.7 nm, the thickness of a Ni layer (8.90 $g/cm^3$) with the same areal loading is 11.2 nm, and the thickness of an Ir layer (22.56 $g/cm^3$) with the same areal loading is 4.4 nm. One or more layers can be deposited, resulting in a catalyst material with an overall planar equivalent thickness equal to the sum of each constituent layer's planar equivalent thickness.

In some embodiments, the catalyst material has a thickness that is the planar equivalent thickness of the catalyst material divided by the combined surface area of the whiskers and the backing. For example, a catalyst material with a planar equivalent thickness of 20 nm deposited onto a surface comprising microstructured whiskers on a planar backing with a combined surface area of 10 $cm^2$ of surface area per $cm^2$ of planar backing area will result in a catalyst thickness of 2 nm on the whisker. The surface area of the whiskers depends upon the whisker cross-sectional dimension, whisker length, and whisker areal number density (number of whiskers per unit area of backing). In some embodiments, the surface area of the whiskers is in a range from 1 to 100 $cm^2$ per $cm^2$ of backing surface area (in some embodiments, in a range from 2 to 50 cm$^2$ per cm$^2$, 5 to 25 cm$^2$ per cm$^2$, or even 5 to 15 cm$^2$ per cm$^2$). In some embodiments, the backing may have a surface area in a range of 1 to 10 cm$^2$ per cm$^2$ planar backing area (in some embodiments, in a range from 1 to 5 cm$^2$ per cm$^2$, or even in a range from 1 to 2 cm$^2$ per cm$^2$). The combined surface area of the whiskers and the backing is the product of the whisker surface area and the backing surface area. For example, whiskers which have a surface area of 10 cm$^2$ per cm$^2$ backing area on a backing which has a surface area of 1.5 cm$^2$ of surface area per cm$^2$ planar backing area, will yield a combined surface area of 15 cm$^2$ of combined surface area per cm$^2$ planar backing area.

In some embodiments, methods for making catalyst material herein comprise annealing the catalyst. In general, annealing can be done by techniques known in the art, including heating the catalyst material via, for example, in an oven or furnace, with a laser, and with infrared techniques. Annealing can be conducted, for example, in inert or reactive gas environments. Although not wanting to be bound by theory, it is believed annealing can induce structural changes on the atomic scale which can influence activity and durability of catalysts. Further, it is believed annealing nanoscale particles and films can induce mobility in the atomic constituent(s), which can cause growth of particles or thin film grains. In the case of multi-element mixtures, alloys, or layered particles and films, it is believed annealing can induce, for example, segregation of components within the particle or film to the surface, formation of random, disordered alloys, and formation of ordered intermetallics, depending upon the component element properties and the annealing environment. For additional details regarding annealing see, for example, van der Vliet et al., Nature Materials, 2012, 11, pp. 1051-1058; Wang et al., Nature Materials, 2013, 12, pp. 81-87, and U.S. Pat. No. 8,748,330 B2 (Debe et al.), the disclosures of which are incorporated herein by reference.

In some embodiments, the catalyst is essentially nonporous (i.e., the catalyst contains spherical and/or aspherical void volume, wherein the void volume is at least 75% contained within the catalyst thin film (in some embodiments, 85, 90, 95, 99, or even 100% contained within the catalyst thin film), and wherein the average diameter of the void volume is less than 1 nm (in some embodiments, less than 0.8 nm, 0.6 nm, 0.4 nm, 0.2 nm, or even 0.01 nm)).

In some embodiments, methods for making catalyst described herein comprise depositing any of the layers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition. In some embodiments, methods for making catalyst described herein comprise annealing at least one of the layers.

In some embodiments, methods for making the catalyst described herein comprises electrochemically cycling the catalyst. In some embodiments, methods for making the catalyst described herein comprise cycling the catalyst in an acidic electrolyte. In some embodiments, methods for making the catalyst described herein comprise cycling the catalyst between 0.60 and 1.00 V versus the potential of a standard hydrogen electrode.

In some embodiments, the microstructured whiskers are attached to a backing (e.g., a membrane). In some embodiments, wherein the backing has a microstructure on at least one of its surfaces.

Catalysts described herein are useful, for example, in fuel cell membrane electrode assemblies (MEAs). "Membrane electrode assembly" refers to a layered sandwich of fuel cell materials comprising a membrane, anode and cathode electrode layers, and gas diffusion layers. Typically, the cathode catalyst layer comprises a catalyst described herein, although in some embodiments, the anode catalyst layer independently comprises a catalyst described herein.

In some embodiments, an article comprises the catalyst described herein. In some embodiments, the article comprises no electrically conductive carbon-based material.

An MEA comprises, in order:
a first gas distribution layer having first and second opposed major surfaces;
an anode catalyst layer having first and second opposed major surfaces, the anode catalyst comprising a first catalyst;
an electrolyte membrane;
a cathode catalyst layer having first and second opposed major surfaces, the cathode catalyst comprising a second catalyst; and
a second gas distribution layer having first and second opposed major surfaces.

Electrolyte membranes conduct reaction intermediate ions between the anode and cathode catalyst layers. Electrolyte membranes preferably have high durability in the electrochemical environment, including chemical and electrochemical oxidative stability. Electrolyte membranes preferably have low ionic resistance for the transport of the reaction intermediate ions, but are relatively impermeable barriers for other ions, electrons, and reactant species. In some embodiments, the electrolyte membrane is a proton exchange membrane (PEM), which conducts cations. In PEM fuel cells, the electrolyte membrane preferably conducts protons. PEMs are typically a partially fluorinated or perfluorinated polymer comprised of a structural backbone and pendant cation exchange groups, PEMs are available, for example, from E. I. du Pont de Nemours and Company, Wilmington, DE, under the trade designation "NAFION;" Solvay, Brussels, Belgium, under the trade designation "AQUIVION;" 3M Company, St. Paul, MN, under the designation "3M PFSA MEMBRANE;" and Asahi Glass Co., Tokyo, Japan, under the trade designation "FLEMION."

A gas distribution layer generally delivers gas evenly to the electrodes and, in some embodiments, conducts electricity. It also provides for removal of water in either vapor or liquid form, in the case of a fuel cell. Gas distribution layers are typically porous to allow reactant and product transport between the electrodes and the flow field. Sources of gas distribution layers include carbon fibers randomly oriented to form porous layers, in the form of non-woven paper or woven fabrics. The non-woven carbon papers are available, for example, from Mitsubishi Rayon Co., Ltd., Tokyo, Japan, under the trade designation "GRAFIL U-105;" Toray Corp., Tokyo, Japan, under the trade designation "TORAY;" AvCarb Material Solutions, Lowell, MA, under the trade designation "AVCARB;" SGL Group, the Carbon Company, Wiesbaden, Germany, under the trade designation "SIGRACET;" Freudenberg FCCT SE & Co. KG, Fuel Cell Component Technologies, Weinheim, Germany, under the trade designation "FREUDENBERG;" and Engineered Fibers Technology (EFT), Shelton, CT, under the trade designation "SPECTRACARB GDL." The woven carbon fabrics or cloths are available, for example, from ElectroChem Inc., Woburn, MA, under the trade designations "EC-CC1-060" and "EC-AC-CLOTH;" NuVant Systems Inc., Crown Point, IN, under the trade designations "ELAT-LT" and "ELAT;" BASF Fuel Cell GmbH, North America, under the trade designation "E-TEK ELAT LT;" and Zoltek Corp., St. Louis, MO, under the trade designation "ZOLTEK CARBON CLOTH." The non-woven paper or woven fabrics can be treated to modify its hydrophobicity (e.g., treatment with a polytetrafluoroethylene (PTFE) suspension with subsequent drying and annealing). Gas dispersion layers often comprise a porous layer of sub-micrometer electronically-conductive particles (e.g., carbon), and a binder (e.g., PTFE). Although not wanting to be bound by theory, it is believed that gas dispersion layers facilitate reactant and product water transport between the electrode and the gas distribution layers.

At least one of the anode or cathode catalyst is catalyst described herein. In some embodiments, wherein the catalyst surface area is at least 5 (in some embodiments, at least 6, 7, 8, 9, 10, 11, 12, 13, 14, 15, 20, 25, 30, 35, 40, 45, or even at least 49) percent greater than would be present without the presence of the Ir layer. The "other catalyst layer" can be a conventional catalyst known in the art, and provided by techniques known in the art (e.g., U.S. Pat. No. 5,759,944 (Buchanan et al.), U.S. Pat. No. 5,068,161 (Keck et al.), and U.S. Pat. No. 4,447,506 (Luczak et al.)), the disclosures of which are incorporated herein by reference.

A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

Figure 2:
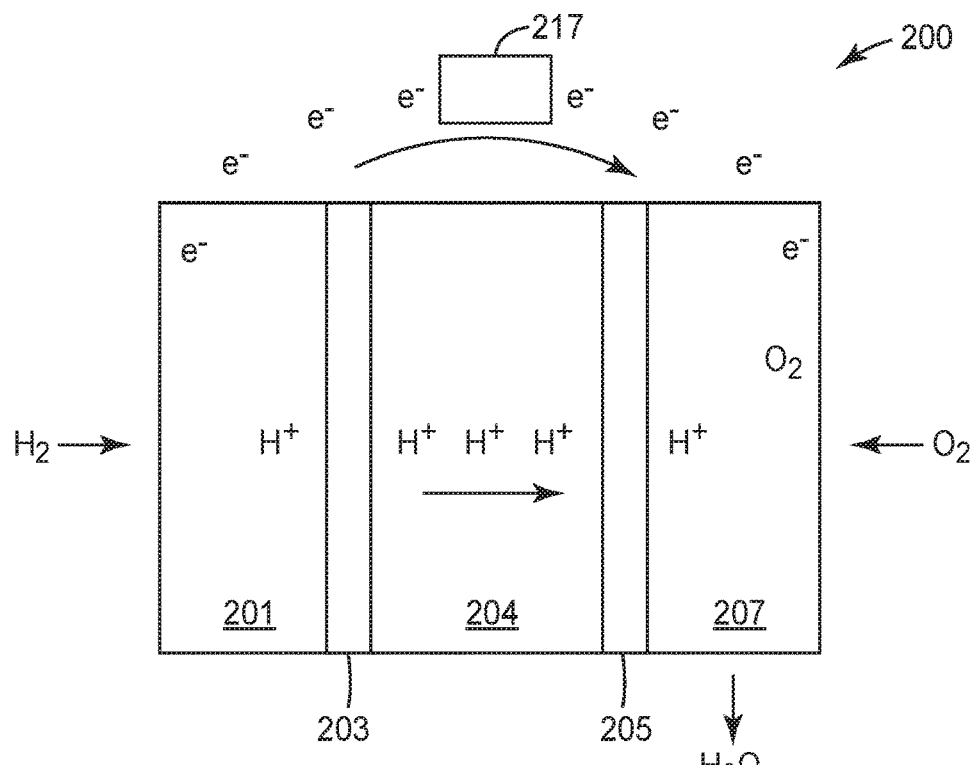
FIG. 2 is a schematic of an exemplary fuel cell.

Referring to FIG. 2, exemplary fuel cell 200 includes first gas distribution layer 201 adjacent to anode 203. Adjacent anode 203 is an electrolyte membrane 204. Cathode 205 is situated adjacent the electrolyte membrane 204, and second gas distribution layer 207 is situated adjacent cathode 205. In operation, hydrogen fuel is introduced into the anode portion of the fuel cell 200, passing through the first gas distribution layer 201 and over anode 203. At anode 203, the hydrogen fuel is separated into hydrogen ions ($H^+$) and electrons ($e^-$).

Electrolyte membrane 204 permits only the hydrogen ions or protons to pass through electrolyte membrane 204 to the cathode portion of fuel cell 200. The electrons cannot pass through the electrolyte membrane 204 and, instead, flow through an external electrical circuit in the form of electric current. This current can power an electric load 217, such as an electric motor, or be directed to an energy storage device, such as a rechargeable battery.

Oxygen flows into the cathode side of fuel cell 200 via second distribution layer 207. As the oxygen passes over cathode 205, oxygen, protons, and electrons combine to produce water and heat.

Exemplary Embodiments

1A. A catalyst comprising an Ir layer having an outer layer with a layer comprising Pt directly thereon, wherein the Ir layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 30, 0.05 to 2, 0.05 to 1.64, 0.05 to 1, 0.05 to 0.98, 0.05 to 0.39, 0.05 to 0.36, or even 0.8 to 0.85) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2.99, 0.04 to 2.5, 0.04 to 2, 0.04 to 1.57, 0.04 to 1, 0.04 to 0.71, 0.04 to 0.34, or even in a range from 0.04 to 0.31) nanometers, and wherein the Pt and Ir are present in an atomic ratio in a range from 0.01:1 to 10:1 (in some embodiments, in a range from 0.04:1 to 2.85:1, 0.35:1 to 1.79:1, 0.72:1 to 1.18:1, 0.19:1 to 5.90:1, 0.31:1 to 5.90:1, 0.76:1 to 1.88:1, or in a range from even 0.85:1 to 3.87:1).

2A. The catalyst of Exemplary Embodiment 1A, wherein the catalyst surface area is at least 5 (in some embodiments, at least 6, 7, 8, 9, 10, 11, 12, 13, 14, 15, 20, 25, 30, 35, 40, 45, or even at least 49) percent greater than would be present without the presence of the Ir layer.

3A. The catalyst of either Exemplary Embodiment 1A or 2A, further comprising at least one pair of alternating layers, wherein the first alternating layer comprises Ir, and wherein the second alternating layer comprises Pt.

4A. The catalyst of any preceding A Exemplary Embodiment, wherein the catalyst further comprises nanoscopic metal crystallites extending from the surface of the catalyst.

5A. The catalyst of Exemplary Embodiment 4A, wherein the surface metal crystallites comprise at least 10 (in some embodiments, at least 15, 20, 25, 30, 40, 50, 60, 70, 75, 80, 90, 95, 98, 99, or even at least 99.9) atomic % Ir.

6A. The catalyst of Exemplary Embodiment 4A or 5A, wherein the surface metal crystallites have a length in a range from 0.25 to 10 (in some embodiments, in a range from 0.25 to 8, 0.25 to 6, 0.25 to 4, 0.25 to 3, 0.25 to 2, 0.25 to 1, 1 to 10, 1 to 8, 1 to 6, 1 to 4, 1 to 3, or even in a range from 1 to 2) nanometers.

7A. The catalyst of Exemplary Embodiment 4A or 5A, wherein the surface metal crystallites have lengths less than 8 (in some embodiments, less than 7, 6, 5, 4, 3, 2, or even less than 1) nanometers.

8A. The catalyst of Exemplary Embodiment 4A or 5A, wherein the surface metal crystallites have diameters in a range from 0.25 to 5 (in some embodiments, in a range from 0.25 to 4, 0.25 to 3, 0.25 to 2, 0.25 to 1, 1 to 5, 1 to 4, 1 to 3, or even in a range from 1 to 2) nanometers.

9A. The catalyst of Exemplary Embodiment 4A or 5A, wherein the surface metal crystallites have diameters less than 5 (in some embodiments, less than 4, 3, 2, or even a diameter less than 1) nanometers.

10A. The catalyst of any preceding A Exemplary Embodiment, wherein the layer comprising Pt further comprises Ni.

11A. The catalyst of Exemplary Embodiment 10A, wherein the Pt to Ni atomic ratio is in a range from 0.5:1 to 5:1 (in some embodiments, in a range from 0.5:1 to 2:1, 0.5:1 to 1:1, 0.57:1 to 0.69:1, or even 0.58:1 to 0.62:1).

1B. An article comprising nanostructured elements comprising microstructured whiskers having an outer surface having the catalyst of any preceding A Exemplary Embodiment thereon.

2B. The article of Exemplary Embodiment 1B, wherein the Ir layer is directly on the microstructured whiskers.

3B. The catalyst of either Exemplary Embodiment 1B or 2B, further comprising at least one pair of alternating layers disposed between the outer surface of the microstructured whiskers and the layer comprising Ir, wherein the first alternating layer comprises Ir and is directly on the microstructured whiskers, and wherein the second alternating layer comprises Pt.

4B. The catalyst of any preceding B Exemplary Embodiment, wherein the microstructured whiskers are attached to a backing (e.g., a membrane).

5B. The catalyst of Exemplary Embodiment 4B, wherein the backing has a microstructure on at least one of its surfaces.

6B. The article according to any preceding B Exemplary Embodiment which comprises no electrically conductive carbon-based material.

1C. A method of making the article of any preceding A Exemplary Embodiment, the method comprising depositing any of the layers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition.

2C. A method of making the article of any preceding B Exemplary Embodiment, the method comprising depositing any of the layers onto microstructured whiskers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition.

3C. The method of any preceding C Exemplary Embodiment, further comprising annealing at least one of the layers.

1D. A method for making the catalyst of any preceding A Exemplary Embodiment, the method comprising electrochemically cycling the catalyst.

2D. The method of Exemplary Embodiment 1D, further comprising cycling the catalyst in an acidic electrolyte.

3D. The method of either Exemplary Embodiment 1D or 2D, further comprising cycling the catalyst in a range from 0.60 to 1.00 V versus the potential of a standard hydrogen electrode.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Preparatory Example A

Microstructured whiskers employed as catalyst supports were made according to the process described in U.S. Pat. No. 5,338,430 (Parsonage et al.), U.S. Pat. No. 4,812,352 (Debe), and U.S. Pat. No. 5,039,561 (Debe), incorporated herein by reference, using as substrates the microstructured catalyst transfer substrates (or MCTS) described in U.S. Pat. No. 6,136,412 (Spiewak et al.), also incorporated herein by reference. Perylene red pigment (i.e., N,N'-di(3,5-xylyl) perylene-3,4:9,10-bis(dicarboximide)) (C.I. Pigment Red 149, also known as "PR149", obtained from Clariant, Charlotte, NC) was sublimation vacuum coated onto MCTS with a nominal thickness of 200 nm, after which it was annealed. After deposition and annealing, highly oriented crystal structures were formed with large aspect ratios, controllable lengths of about 0.5 to 2 micrometers, widths of about 0.03-0.05 micrometer and areal number density of about 30 whiskers per square micrometer, oriented substantially normal to the underlying substrate.

Comparative Example A

Nanostructured thin film (NSTF) catalyst layers were prepared by sputter coating catalyst films sequentially using a DC-magnetron sputtering process onto the layer of microstructured whiskers, Preparatory Example A. A vacuum sputter deposition system was used with typical Ar sputter gas pressures of about 3.3 mTorr (0.44 Pa), and a 5-inch× 15-inch (12.7 cm×38.1 cm) rectangular Pt sputter target. The system base pressure was typically $2.5 \times 10^{-5}$ Torr (0.0033 Pa), and the typically determined background gas was water vapor. The coatings were deposited by using ultra high purity Ar as the sputtering gas.

A single Pt layer with planar equivalent thickness of about 0.25 nm was first deposited onto the whiskers on MCTS from a pure Pt target. The Pt deposition process was repeated 50 times. The resultant deposition consisted of a single, contiguous Pt thin film with an overall contiguous Pt planar equivalent thickness of about 12.6 nm, summarized in Table 1, below.

TABLE 1

| Example | Structure | Contiguous Planar Equivalent Thickness, nm | | | Contiguous Thickness on Support, nm | | |
|---|---|---|---|---|---|---|---|
| | | Pt | X | Pt + X | Pt | X | Pt + X |
| Comparative Example A | Pt | 12.59 | 0.00 | 12.59 | 0.90 | 0.00 | 0.90 |
| Comparative Example B | Pt | 25.17 | 0.00 | 25.17 | 1.80 | 0.00 | 1.80 |
| Comparative Example C | Pt | 6.06 | 0.00 | 6.06 | 0.43 | 0.00 | 0.43 |
| Comparative Example D | Pt | 11.19 | 0.00 | 11.19 | 0.80 | 0.00 | 0.80 |
| Comparative Example E | Pt | 45.69 | 0.00 | 45.69 | 3.26 | 0.00 | 3.26 |
| Comparative Example F | Ir/Pt | 13.99 | 0.53 | 14.52 | 1.00 | 0.04 | 1.04 |
| Comparative Example G | Ir/Pt | 13.99 | 1.46 | 15.45 | 1.00 | 0.10 | 1.10 |
| Comparative Example H | Ir/Pt | 13.99 | 4.39 | 18.37 | 1.00 | 0.31 | 1.31 |
| Comparative Example I | Ir/Pt | 13.99 | 5.63 | 19.62 | 1.00 | 0.40 | 1.40 |
| Comparative Example J | Ir | 0.00 | 11.49 | 11.49 | 0.00 | 0.82 | 0.82 |
| Example 1 | Pt/Ir | 0.52 | 11.49 | 12.01 | 0.04 | 0.82 | 0.86 |
| Example 2 | Pt/Ir | 1.95 | 11.49 | 13.44 | 0.14 | 0.82 | 0.96 |
| Example 3 | Pt/Ir | 4.33 | 11.49 | 15.83 | 0.31 | 0.82 | 1.13 |
| Example 4 | Pt/Ir | 8.86 | 11.49 | 20.35 | 0.63 | 0.82 | 1.45 |

TABLE 1-continued

| Example | Structure | Contiguous Planar Equivalent Thickness, nm | | | Contiguous Thickness on Support, nm | | |
|---|---|---|---|---|---|---|---|
| | | Pt | X | Pt + X | Pt | X | Pt + X |
| Example 5 | Pt/Ir | 14.45 | 11.49 | 25.95 | 1.03 | 0.82 | 1.85 |
| Example 6 | Pt/Ir | 21.91 | 11.49 | 33.41 | 1.57 | 0.82 | 2.39 |
| Example 7 | Pt/Ir | 34.97 | 11.49 | 46.46 | 2.50 | 0.82 | 3.32 |
| Example 8 | Pt/Ir | 4.75 | 0.75 | 5.50 | 0.34 | 0.05 | 0.39 |
| Example 9 | Pt/Ir | 4.76 | 2.38 | 7.14 | 0.34 | 0.17 | 0.51 |
| Example 10 | Pt/Ir | 4.38 | 5.39 | 9.77 | 0.31 | 0.39 | 0.70 |
| Example 11 | Pt/Ir | 4.45 | 13.67 | 18.13 | 0.32 | 0.98 | 1.29 |
| Example 12 | Pt/Ir | 4.64 | 22.91 | 27.55 | 0.33 | 1.64 | 1.97 |
| Example 13 | Pt/Ir | 4.33 | 11.49 | 15.83 | 0.31 | 0.82 | 1.13 |
| Comparative Example K | Ir/Pt | 4.71 | 6.03 | 10.74 | 0.34 | 0.43 | 0.77 |
| Comparative Example L | PtIr | 0.33 | 0.52 | 0.85 | 0.02 | 0.04 | 0.06 |
| Comparative Example M | Pt/Au | 4.66 | 5.18 | 9.84 | 0.33 | 0.37 | 0.70 |
| Example 14 | PtNi/Ir | 9.88 | 4.80 | 14.68 | 0.71 | 0.34 | 1.05 |
| Example 15 | PtNi/Ir | 21.52 | 5.05 | 26.57 | 1.54 | 0.36 | 1.90 |
| Comparative Example N | PtNi | 8.61 | 0.00 | 8.61 | 0.62 | 0.00 | 0.62 |
| Comparative Example O | Ir/PtNi | 8.61 | 2.22 | 10.83 | 0.62 | 0.16 | 0.77 |

Since the metal was deposited onto the NSTF support-coated MCTS substrate, which has intrinsic roughness, the thickness of the metal film on the support is thinner than the planar equivalent thickness by the factor of the overall support and substrate roughness factor. The NSTF support is estimated to provide 10 cm$^2$ of surface area per cm$^2$ of planar area, and the MCTS provided an additional 1.4 cm$^2$ of surface area, and as such the overall surface area was 14 cm$^2$. 12.6 nm planar equivalent thickness spread over 14 cm$^2$/cm$^2$ was about 0.9 nm.

Representative areas of the electrocatalyst were analyzed for bulk composition using X-Ray Fluorescence spectroscopy (XRF). Representative catalyst samples were evaluated on MCTS using a wavelength dispersive X-ray fluorescence spectrometer (obtained under the trade designation "PRI-MUS II" from Rigaku Corporation, Tokyo, Japan) equipped with a rhodium (Rh) X-ray source, a vacuum atmosphere, and a 20-mm diameter measurement area. Each sample was analyzed three times to obtain the average and standard deviation for the measured Pt, Ni, and Ir signal intensities, which are proportional to loading. The electrocatalyst's Pt, Ni, and Ir loadings were determined by comparing their measured XRF intensities to the XRF intensities obtained with standard NSTF electrocatalysts containing Pt, Ni, and Ir with known areal loadings. From the XRF-determined Pt, Ni, and Ir loadings, the catalyst's composition was calculated. Loading and composition information for Comparative Example A is provided in Table 2, below. Comparative Example A contained 27 micrograms/cm$^2$ of Pt, and did not contain measurable Ni or Ir.

TABLE 2

| Example | X | Loading, micrograms/cm$^2$ | | | Mole Fraction | | | Pt:Ni Ratio | Pt:X Ratio | Annealed |
|---|---|---|---|---|---|---|---|---|---|---|
| | | Pt | Ni | X | Pt | Ni | X | | | |
| Comparative Example A | — | 27 | 0 | 0 | 1.00 | 0.00 | 0.00 | — | — | No |
| Comparative Example B | — | 54 | 0 | 0 | 1.00 | 0.00 | 0.00 | — | — | No |
| Comparative Example C | — | 13 | 0 | 0 | 1.00 | 0.00 | 0.00 | — | — | No |
| Comparative Example D | — | 24 | 0 | 0 | 1.00 | 0.00 | 0.00 | — | — | No |
| Comparative Example E | — | 98 | 0 | 0 | 1.00 | 0.00 | 0.00 | — | — | No |
| Comparative Example F | — | 30 | 0 | 1.2 | 0.96 | 0.00 | 0.04 | — | 24.63 | No |
| Comparative Example G | — | 30 | 0 | 3.3 | 0.90 | 0.00 | 0.10 | — | 8.96 | No |
| Comparative Example H | — | 30 | 0 | 9.9 | 0.75 | 0.00 | 0.25 | — | 2.99 | No |
| Comparative Example I | — | 30 | 0 | 12.7 | 0.70 | 0.00 | 0.30 | — | 2.33 | No |
| Comparative Example J | Ir | 0 | 0 | 26 | 0.00 | 0.00 | 1.00 | — | 0.00 | Yes |
| Example 1 | Ir | 1.1 | 0 | 26 | 0.04 | 0.00 | 0.96 | — | 0.04 | Yes |
| Example 2 | Ir | 4.2 | 0 | 26 | 0.14 | 0.00 | 0.86 | — | 0.16 | Yes |
| Example 3 | Ir | 9.3 | 0 | 26 | 0.26 | 0.00 | 0.74 | — | 0.35 | Yes |
| Example 4 | Ir | 19 | 0 | 26 | 0.42 | 0.00 | 0.58 | — | 0.72 | Yes |

TABLE 2-continued

| Example | X | Loading, micrograms/cm² | | | Mole Fraction | | | Pt:Ni Ratio | Pt:X Ratio | Annealed |
|---|---|---|---|---|---|---|---|---|---|---|
| | | Pt | Ni | X | Pt | Ni | X | | | |
| Example 5 | Ir | 31 | 0 | 26 | 0.54 | 0.00 | 0.46 | — | 1.18 | Yes |
| Example 6 | Ir | 47 | 0 | 26 | 0.64 | 0.00 | 0.36 | — | 1.79 | Yes |
| Example 7 | Ir | 75 | 0 | 26 | 0.74 | 0.00 | 0.26 | — | 2.85 | Yes |
| Example 8 | Ir | 10 | 0 | 1.7 | 0.86 | 0.00 | 0.14 | — | 5.90 | Yes |
| Example 9 | Ir | 10 | 0 | 5.4 | 0.65 | 0.00 | 0.35 | — | 1.88 | Yes |
| Example 10 | Ir | 9.4 | 0 | 12 | 0.43 | 0.00 | 0.57 | — | 0.76 | Yes |
| Example 11 | Ir | 10 | 0 | 31 | 0.23 | 0.00 | 0.77 | — | 0.31 | Yes |
| Example 12 | Ir | 10 | 0 | 52 | 0.16 | 0.00 | 0.84 | — | 0.19 | Yes |
| Example 13 | Ir | 9.3 | 0 | 26 | 0.26 | 0.00 | 0.74 | — | 0.35 | No |
| Comparative Example K | Ir | 10 | 0 | 14 | 0.42 | 0.00 | 0.58 | — | 0.73 | Yes |
| Comparative Example L | Ir | 10 | 0 | 14 | 0.42 | 0.00 | 0.58 | — | 0.74 | Yes |
| Comparative Example M | Au | 10 | 0 | 10 | 0.50 | 0.00 | 0.51 | | 1.01 | Yes |
| Example 14 | Ir | 9 | 4.9 | 11 | 0.25 | 0.45 | 0.30 | 0.57 | 0.85 | Yes |
| Example 15 | Ir | 21 | 10 | 11 | 0.31 | 0.52 | 0.17 | 0.61 | 1.82 | Yes |
| Comparative Example N | Ir | 9 | 4 | 0 | 0.41 | 0.59 | 0.00 | 0.69 | — | Yes |
| Comparative Example O | Ir | 9 | 4 | 5 | 0.33 | 0.48 | 0.19 | 0.69 | 1.77 | Yes |

Next, the catalyst's electrochemical performance was assessed by assembling into a membrane electrode assembly (MEA), and operating the catalyst as a fuel cell cathode, as described below. Typically, at least 2 separate MEAs for each catalyst type were fabricated and assessed, and average values are reported.

Comparative Example A catalyst and NSTF PtCoMn coated anode catalyst whiskers (0.05 mg$_{Pt}$/cm², Pt$_{69}$Co$_{28}$Mn$_3$) on MCTS were then transferred to either side of a 24-micrometer thick proton exchange membrane (obtained under the trade designation "3M PFSA 825EW" (neat) from 3M Company, St. Paul, MN), using a laminator (obtained under the trade designation "HL-101" from ChemInstruments, Inc., West Chester Township, OH) to form a catalyst coated membrane (CCM). The three-layer stack-up was hand fed into the laminator with hot nip rolls at 270° F. (132° C.), 150 psi (1.03 MPa) nip, and rotating at the equivalent of 0.5 fpm (0.25 cm/s). Immediately after lamination, the MCTS layers were peeled back, leaving the catalyst coated whiskers embedded into either side of the PEM. The CCM was installed with identical gas diffusion layers (obtained under the trade designation "3M 2979 GAS DIFFUSION LAYERS" from 3M Company) on the anode and cathode in 50 cm² active area test cells (obtained under the trade designation "50 CM² CELL HARDWARE" from Fuel Cell Technologies, Inc., Albuquerque, N.M.) with quad-serpentine flow fields with gaskets selected to give 10% compression of the gas diffusion layers. Comparative Example A catalyst was evaluated as the fuel cell cathode.

After assembly, the test cells were connected to a test station (obtained under the trade designation "SINGLE FUEL CELL TEST STATION" from Fuel Cell Technologies, Inc.). The MEA was then operated for about 40 hours under a conditioning protocol to achieve apparent steady state performance. The protocol consisted of repeated cycles of operational and shutdown phases, each about 40 and 45 minutes in duration, respectively. In the operational phase, the MEA was operated at 75° C. cell temperature, 70° C. dewpoint, 101/101 kPaA H$_2$/Air, with constant flow rates of 800 and 1800 standard cubic centimeters per minute (sccm) of H$_2$ and air, respectively. During the 40-minute operational phase, the cell voltage was alternated between 5-minute long polarization cycles between 0.85 V and 0.25 V and 5-minute long potential holds at 0.40 V. During the 45-minute shutdown phase, the cell potential was set to open circuit voltage, H$_2$ and air flows to the cell were halted, and the cell temperature was cooled towards room temperature while liquid water was injected into the anode and cathode cell inlets at 0.26 g/min. and 0.40 g/min., respectively.

After conditioning the MEAs, the electrocatalysts were characterized for relevant beginning of life (BOL) characteristics, including catalyst activity, surface area, and operational performance under relevant H$_2$/Air test conditions, described as follows.

The cathode oxygen reduction reaction (ORR) absolute activity was measured with saturated 150 kPaA H$_2$/O$_2$, 80° C. cell temperature for 1200 seconds at 900 mV vs. the 100% H$_2$ reference/counter electrode. The ORR absolute activity (A/cm² or mA/cm²) was obtained by adding the measured current density after 1050 seconds of hold time and the electronic shorting and hydrogen crossover current densities, estimated from 2 mV/s cyclic voltammograms measured with N$_2$ fed to the working electrode instead of O$_2$. The electrocatalyst mass activity, a measure of the catalyst activity per unit precious metal content, is calculated by dividing the corrected ORR absolute activity (A/cm²$_{planar}$) by the cathode Pt areal loading (mg/cm²) to obtain the Pt mass activity (A/mg$_{Pt}$), or by dividing the corrected ORR absolute activity by the cathode total platinum group metal (PGM) areal loading to obtain the PGM mass activity (A/mg$_{PGM}$). The Pt and PGM mass activities of Comparative Example A are 0.16 A/mg$_{Pt}$ and 0.16 A/mg$_{PGM}$, reported in Table 3, below.

TABLE 3

| | ORR Mass Activity | | Specific Area | Specific Activity |
|---|---|---|---|---|
| Example | A/mg$_{Pt}$ | A/mg$_{PGM}$ | m²$_{PGM}$/g$_{PGM}$ | mA/cm²$_{PGM}$ |
| Comparative Example A | 0.16 | 0.16 | 11.4 | 1.37 |
| Comparative Example B | 0.15 | 0.15 | 9.5 | 1.61 |

TABLE 3-continued

| Example | ORR Mass Activity A/mg$_{Pt}$ | A/mg$_{PGM}$ | Specific Area m²$_{PGM}$/g$_{PGM}$ | Specific Activity mA/cm²$_{PGM}$ |
|---|---|---|---|---|
| Comparative Example C | 0.14 | 0.14 | 10.4 | 1.42 |
| Comparative Example D | 0.16 | 0.16 | 13.2 | 1.24 |
| Comparative Example E | 0.16 | 0.16 | 8.0 | 2.01 |
| Comparative Example F | 0.14 | 0.14 | 10.5 | 1.32 |
| Comparative Example G | 0.12 | 0.14 | 10.1 | 1.21 |
| Comparative Example H | 0.11 | 0.15 | 9.8 | 1.11 |
| Comparative Example I | 0.10 | 0.15 | 11.0 | 0.94 |
| Comparative Example J | — | −0.05 | 22.6 | −0.24 |
| Example 1 | 1.45 | 0.06 | 22.4 | 0.27 |
| Example 2 | 1.13 | 0.15 | 21.1 | 0.74 |
| Example 3 | 0.84 | 0.22 | 19.9 | 1.11 |
| Example 4 | 0.57 | 0.25 | 15.9 | 1.55 |
| Example 5 | 0.50 | 0.27 | 14.4 | 1.89 |
| Example 6 | 0.36 | 0.23 | 12.7 | 1.84 |
| Example 7 | 0.20 | 0.15 | 9.9 | 1.50 |
| Example 8 | 0.28 | 0.24 | 17.0 | 1.42 |
| Example 9 | 0.33 | 0.22 | 16.9 | 1.29 |
| Example 10 | 0.63 | 0.28 | 18.7 | 1.47 |
| Example 11 | 0.78 | 0.18 | 18.6 | 0.98 |
| Example 12 | 0.78 | 0.13 | 15.4 | 0.82 |
| Example 13 | 0.60 | 0.16 | 19.5 | 0.81 |
| Comparative Example K | 0.52 | 0.22 | 16.8 | 1.31 |
| Comparative Example L | 0.59 | 0.25 | 16.9 | 1.47 |
| Comparative Example M | 0.004 | 0.00 | 0.2 | 0.33 |
| Example 14 | 0.89 | 0.40 | 23.0 | 1.75 |
| Example 15 | 0.47 | 0.30 | 18.4 | 1.64 |
| Comparative Example N | 0.24 | 0.24 | 18.2 | 1.33 |
| Comparative Example O | 0.44 | 0.28 | 18.0 | 1.58 |

The cathode catalyst surface enhancement factor (SEF, m²$_{PGM}$/m²$_{planar}$ or analogously cm²$_{PGM}$/cm²$_{planar}$) was measured via cyclic voltammetry (100 mV/s, 0.65 V-0.85 V, average of 100 scans) under saturated 101 kilopascals absolute pressure (kPaA) H$_2$/N$_2$ and 70° C. cell temperature. The SEF was estimated by taking the average of the integrated hydrogen underpotential deposition (H$_{UPD}$) charge (microC/cm²$_{planar}$) for the oxidative and reductive waves and dividing by 220 microC/cm²$_{Pt}$. The electrocatalyst's specific surface area (m²$_{PGM}$/g$_{PGM}$), a measure of catalyst dispersion, was calculated by dividing the SEF (m²$_{PGM}$/m²$_{planar}$) by the areal PGM loading (g$_{PGM}$/m²$_{planar}$). The specific area of Comparative Example A is 11.4 m²$_{PGM}$/g$_{PGM}$, reported in Table 3, above.

The cathode catalyst oxygen reduction specific activity was calculated by dividing the corrected ORR absolute activity (A/cm²$_{planar}$) by the SEF (cm²$_{PGM}$/cm²$_{planar}$) to obtain the specific activity expressed in (A/cm²$_{PGM}$), or after unit conversion as mA/cm²$_{PGM}$ (multiply (A/cm²) by 1000 mA per A). The specific activity of Comparative Example A is 1.37 mA/cm²$_{PGM}$, summarized in Table 3, above.

After activity and surface area characterization was complete, the H$_2$/Air performance of the MEA was measured. MEAs were operated at 80° C. cell temperature, with the cathode exposed to air (68° C. dewpoint, 150 kPaA, constant stoichiometry 2.5) and anode exposed to H$_2$ (68° C. dewpoint, 150 kPaA, constant stoichiometry 2.0). The MEA current density (J) was stepwise incremented up from 0.02 A/cm² until the cell voltage reached 0.40 V, or J reached 2 A/cm², at which point the scan was reversed. J steps were spaced at 10 per decade and 0.1 A/cm². Polarization data was collected at ~1 Hz with a 120 second dwell time at each J. Reported polarization data are from the average of all datapoints at each J setpoint from the high-to-low current portion of the polarization curve. The polarization curve was linearly interpolated to provide the cell voltage at cell current densities of 0.02 and 0.32 A/cm² and current density at cell voltage of 0.50 V, summarized in Table 4, below.

TABLE 4

| Example | V @ 0.02 A/cm², volt | V @ 0.32 A/cm², volt | J @ 0.50 V, A/cm² |
|---|---|---|---|
| Comparative Example A | 0.799 | 0.603 | 0.500 |
| Comparative Example B | 0.837 | 0.728 | 1.657 |
| Comparative Example C | 0.707 | <<0.4 | 0.116 |
| Comparative Example D | 0.768 | 0.573 | 0.442 |
| Comparative Example E | 0.843 | 0.761 | 1.805 |
| Comparative Example F | 0.803 | 0.639 | 0.651 |
| Comparative Example G | 0.812 | 0.654 | 0.897 |
| Comparative Example H | 0.818 | 0.659 | 0.897 |
| Comparative Example I | 0.820 | 0.668 | 1.112 |
| Comparative Example J | 0.547 | <<0.4 | 0.043 |
| Example 1 | 0.735 | 0.406 | 0.186 |
| Example 2 | 0.810 | 0.614 | 0.655 |
| Example 3 | 0.846 | 0.708 | 1.261 |
| Example 4 | 0.859 | 0.741 | 1.397 |
| Example 5 | 0.856 | 0.739 | 1.479 |
| Example 6 | 0.865 | 0.752 | 1.466 |
| Example 7 | 0.858 | 0.743 | 1.157 |
| Example 8 | 0.771 | 0.436 | 0.264 |
| Example 9 | 0.811 | 0.620 | 0.531 |
| Example 10 | 0.839 | 0.697 | 1.152 |
| Example 11 | 0.843 | 0.702 | 1.234 |
| Example 12 | 0.836 | 0.683 | 1.173 |
| Example 13 | 0.822 | 0.660 | 0.996 |
| Comparative Example K | 0.832 | 0.670 | 1.065 |
| Comparative Example L | 0.814 | 0.670 | 1.048 |
| Comparative Example M | 0.025 | <<0.4 | <0.05 |
| Example 14 | 0.838 | 0.697 | 1.173 |
| Example 15 | 0.851 | 0.729 | 1.225 |
| Comparative Example N | 0.751 | 0.380 | 0.217 |
| Comparative Example O | 0.822 | 0.636 | 0.490 |

Next, the catalyst durability was evaluated using an accelerated stress test (AST). During the AST, the MEA was operated at 80° C. cell temperature, with the cathode exposed to nitrogen (80° C. dewpoint, 100 kPaA, constant flow 1800 sccm) and the anode exposed to H$_2$ (80° C. dewpoint, 100 kPaA, constant flow 800 sccm). Using a potentiostat (obtained under the trade designation "MPG-205" from Biologic Science Instruments, Seyssinet-Pariset, France), the cathode electrode potential was cycled 30,000 between 0.60 and 1.00 V vs. the H$_2$ anode electrode reference potential at 50 mV/s using a triangle wave. After the 30,000 cycles were complete, the MEA was reconditioned and cathode activity, surface area, and the $H_2$/Air performance was again measured. The changes in mass activity, specific area, specific activity, cell voltage at 0.02 A/cm$^2$, cell voltage at 0.32 A/cm$^2$ and in current density at 0.50 V of Comparative Example A after the AST are listed in Table 5, below.

TABLE 5

| Sample | Samples Tested | Mass Activity Change, % | Specific Area Change, % | Specific Activity Change, % | V @ 0.02 A/cm$^2$ Change, mV | V @ 0.32 A/cm$^2$ Change, mV | J @ 0.50 V Change, % |
|---|---|---|---|---|---|---|---|
| Comparative Example A | 2 | −59 | −39 | −33 | −63 | −260 | −67 |
| Comparative Example B | 2 | −43 | −30 | −18 | −53 | −189 | −67 |
| Comparative Example F | 1 | −62 | −28 | −47 | −71 | −353 | −77 |
| Comparative Example G | 1 | −47 | −23 | −31 | −47 | −141 | −63 |
| Comparative Example H | 2 | −44 | −9 | −34 | −23 | −89 | −48 |
| Comparative Example J | 2 | — | −12 | — | −6 | — | −4 |
| Example 3 | 4 | −4 | −6 | 6 | −9 | −16 | −2 |
| Example 4 | 4 | −19 | −8 | −7 | −10 | −19 | 0 |
| Example 5 | 2 | −16 | 3 | −8 | −13 | −8 | 9 |
| Example 6 | 2 | −13 | −7 | −5 | −6 | −4 | 6 |
| Example 10 | 1 | −18 | −12 | −7 | −13 | −36 | −4 |
| Example 15 | 2 | −24 | −13 | −13 | −14 | −24 | −16 |
| Comparative Example N | 1 | −58 | −55 | −5 | −52 | | −54 |
| Comparative Example O | 2 | −36 | −17 | −23 | −42 | −170 | −44 |

Comparative Example B

Comparative Example B was prepared and characterized as described for Comparative Example A, except that the Pt deposition process modified such that the Pt areal loading was 54 micrograms/cm$^2$. The results are provided in Tables 3-5, above.

Comparative Examples C-E

Comparative Examples C-E were prepared and characterized as described for Comparative Example A, except that the Pt deposition process modified such that the Pt areal loadings were 13, 24, and 98 micrograms/cm$^2$, respectively. The Comparative Example C-E catalysts were not evaluated for durability using the AST. The results are provided in Tables 3 and 4, above.

Comparative Example F

Comparative Example F was prepared and characterized as described for Comparative Example A, except that the deposition process was modified to generate a different Pt areal loading and also a layer of Ir was deposited onto the surface of the Pt. Nanostructured thin film (NSTF) catalyst layers were prepared by sputter coating catalyst films sequentially using a DC-magnetron sputtering process onto the layer of microstructured whiskers, Preparatory Example A. A vacuum sputter deposition system was used with typical Ar sputter gas pressures of about 3.3 mTorr (0.44 Pa), and 5-inch×15-inch (12.7 cm×38.1 cm) rectangular Pt and Ir sputter targets. The system base pressure was typically 2.5×10$^{-5}$ Torr (0.0033 Pa), and the typically determined background gas was water vapor. The coatings were deposited by using ultra high purity Ar as the sputtering gas. First, a single Pt layer with planar equivalent thickness of about 1.4 nm was first deposited onto the whiskers on MCTS from a pure Pt target. The Pt deposition process was conducted 10 times, resulting in an areal loading of about 30 micrograms/cm$^2$. Next, a single Ir layer was deposited with a planar equivalent thickness of 0.58 nm. The Ir deposition process was conducted one time, resulting in an areal loading of about 1.3 microgram/cm$^2$. The Comparative Example F catalyst was evaluated for durability using the AST. The results are provided in Tables 3-5, above.

Comparative Examples G-I

Comparative Examples G-I were prepared and characterized as described for Comparative Example F, except that the Ir deposition process modified such that the Ir areal loadings were about 3.3, 9.9, and 12.7 micrograms/cm$^2$, respectively. The Comparative Example G and H catalysts were evaluated for durability using the AST, the Comparative Example I catalyst was not. The results are provided in Tables 3-5, above.

Comparative Example J

Comparative Example J was prepared and characterized as described for Comparative Example F, except that the deposition process was modified such that only Ir was deposited.

Nanostructured thin film (NSTF) catalyst layers were prepared by sputter coating catalyst films sequentially using a DC-magnetron sputtering process onto the layer of microstructured whiskers, Preparatory Example A. A vacuum sputter deposition system was used with typical Ar sputter gas pressures of about 3.3 mTorr (0.44 Pa), and a 5-inch× 15-inch (12.7 cm×38.1 cm) rectangular Ir sputter target. The system base pressure was typically 2.5×10$^{-5}$ Torr (0.0033 Pa), and the typically determined background gas was water vapor. The coatings were deposited by using ultra high purity Ar as the sputtering gas. A single Ir layer with planar equivalent thickness of about 1.1 nm was first deposited onto the whiskers on MCTS from a pure Ir target. The Ir deposition process was conducted 10 times, resulting in an areal loading of about 26 microgram/cm².

After deposition, the electrocatalyst on MCTS was placed into a quartz tube furnace (obtained under the trade designation "LINDBERG BLUE M" from Thermo Electron Corporation, Waltham, MA) and heated to 340° C. under flowing $H_2$. After about a 20-minute temperature ramp, the catalyst was annealed for about 0.5 hour at temperature, and then allowed to cool to room temperature over about a 3-hour period. After cooling to room temperature, the tube furnace was purged with nitrogen for about 15 minutes to remove any remaining $H_2$, after which the catalyst on the substrate was removed from the furnace. Comparative Example J was evaluated for durability using the AST. The results are provided in Tables 3-5, above.

Example 1

Example 1 catalyst was prepared and characterized as described for Comparative Example J, except that after the Ir was deposited onto the whiskers on MCTS, layers of Pt were then deposited. The catalyst was then subsequently annealed with the same protocol as described in Comparative Example J. Example 1 catalyst was not evaluated for durability under the AST.

Nanostructured thin film (NSTF) catalyst layers were prepared by sputter coating catalyst films sequentially using a DC-magnetron sputtering process onto the layer of microstructured whiskers, Preparatory Example A. A vacuum sputter deposition system was used with typical Ar sputter gas pressures of about 3.3 mTorr (0.44 Pa), and 5-inch×15-inch (12.7 cm×38.1 cm) rectangular Pt and Ir sputter targets. The system base pressure was typically $2.5 \times 10^{-5}$ Torr (0.0033 Pa), and the typically determined background gas was water vapor. The coatings were deposited by using ultra high purity Ar as the sputtering gas.

A single Ir layer with planar equivalent thickness of about 1.1 nm was first deposited onto the whiskers on MCTS from a pure Ir target. The Ir deposition process was conducted 10 times, resulting in an areal Ir loading of about 26 micrograms/cm². Next, a single Pt layer was deposited with a planar equivalent thickness of 0.47 nm. The Pt deposition process was conducted 2 times, resulting in an areal Pt loading of about 1.1 microgram/cm². The results are provided in Tables 3 and 4, above.

Examples 2-7

Examples 2-7 were prepared and characterized as described for Example 1, except that the Pt deposition process modified such that the Pt areal loadings were about 4.2, 9.3, 19, 31, 47, and 75 micrograms/cm², respectively. Examples 3-6 were evaluated for durability under the AST, but Example 2 was not. The results are provided in Tables 3-5, above.

After fuel cell testing, Example 2 catalyst was additionally analyzed for nanometer-scale structure by transmission electron microscopy (TEM). After durability testing, Example 3 catalyst was additionally analyzed for nanometer-scale structure and composition by TEM and energy dispersive X-ray spectroscopy (EDS).

Example 8

Example 8 catalyst was prepared and characterized as described for Example 1, except that the Pt and Ir contents differed as shown in Table 2, above.

Nanostructured thin film (NSTF) catalyst layers were prepared by sputter coating catalyst films sequentially using a DC-magnetron sputtering process onto the layer of microstructured whiskers, Preparatory Example A. A vacuum sputter deposition system was used with typical Ar sputter gas pressures of about 3.3 mTorr (0.44 Pa), and 5-inch×15-inch (12.7 cm×38.1 cm) rectangular Pt and Ir sputter targets. The system base pressure was typically $2.5 \times 10^{-5}$ Torr (0.0033 Pa), and the typically determined background gas was water vapor. The coatings were deposited by using ultra high purity Ar as the sputtering gas.

A single Ir layer with planar equivalent thickness of about 0.38 nm was first deposited onto the whiskers on MCTS from a pure Ir target. The Ir deposition process was conducted 2 times, resulting in an areal Ir loading of about 1.7 microgram/cm². Next, a single Pt layer was deposited with a planar equivalent thickness of 0.40 nm. The Pt deposition process was conducted 12 times, resulting in an areal loading of about 10.2 micrograms/cm² of Pt. The Example 8 catalyst was not evaluated for durability using the AST. The results are provided in Tables 3 and 4, above.

Examples 9-12

Examples 9-12 were prepared and characterized as described for Example 8, except that the Ir deposition process was modified such that the Ir areal loadings were about 5.4, 12, 31, and 52 micrograms/cm², respectively. Example 10 was evaluated for durability under the AST, but Examples 9, 11, and 12 were not. The results are provided in Tables 3-5, above.

Additionally, Example 10 catalyst was analyzed for nanometer-scale structure and composition by TEM and EDS after catalyst deposition, after annealing, after fuel cell testing, and after durability testing with the AST. The results are shown in FIGS. 10-17.

Example 13

Example 13 was prepared and characterized as described for Example 3, except the catalyst was not annealed and was not evaluated for durability under the AST. The results are provided in Tables 3 and 4, above.

Comparative Example K

Comparative Example K was prepared and characterized as described for Example 10, except that the deposition order of Pt and Ir was reversed. First, about 10 micrograms/cm² of Pt was deposited, and then about 14 micrograms/cm² of Ir was deposited. Comparative Example K was not evaluated for durability under the AST. The results are provided in Tables 3 and 4, above.

Comparative Example L

Comparative Example L prepared and characterized as described for Example 10, except that the deposition conditions were changed to produce multiple, alternating thinner layers of Pt and Ir to promote formation of a PtIr alloy catalyst. First, a single Ir layer with planar equivalent thickness of about 0.52 nm was first deposited onto the whiskers on MCTS from a pure Ir target. Next, a single Pt layer was deposited with a planar equivalent thickness of 0.33 nm. The alternating Ir and Pt deposition processes was conducted 12 times, resulting in an areal Pt loading of about 10.3 micrograms/cm² and an areal Ir loading of about 14 micrograms/cm². Comparative Example L was not evaluated for durability under the AST. The results are provided in Tables 3 and 4, above.

Comparative Example M

Comparative Example M was prepared and characterized as described for Example 10, except that 10 micrograms/cm² of Au was deposited instead of Ir and Comparative Example M was not evaluated for durability with the AST. The results are provided in Tables 3 and 4, above.

Example 14

Example 14 catalyst was prepared and characterized as described for Example 1, except that the Pt and Ir contents differed and the Pt layer also contained Ni. Example 14 catalyst was not evaluated for durability with the AST.

Nanostructured thin film (NSTF) catalyst layers were prepared by sputter coating catalyst films sequentially using a DC-magnetron sputtering process onto the layer of microstructured whiskers, Preparatory Example A. A vacuum sputter deposition system was used with typical Ar sputter gas pressures of about 3.3 mTorr (0.44 Pa), and 5-inch×15-inch (12.7 cm×38.1 cm) rectangular Pt, Ir, and Ni sputter targets. The system base pressure was typically $2.5\times10^{-5}$ Torr (0.0033 Pa), and the typically determined background gas was water vapor. The coatings were deposited by using ultra high purity Ar as the sputtering gas.

A single Ir layer with planar equivalent thickness of about 0.89 nm was first deposited onto the whiskers on MCTS from a pure Ir target. The Ir deposition process was repeated 5 times, resulting in an areal loading of about 11 micrograms Ir/cm². Next, a single Pt layer was deposited with a planar equivalent thickness of 2.3 nm, and a single Ni layer was deposited with a planar equivalent thickness of 2.8 nm. The Pt deposition process and Ni deposition process were conducted twice, in order, resulting in an areal Pt loading of about 9.3 micrograms/cm² and an areal Ni loading of about 4.9 micrograms/cm². The results are provided in Tables 3 and 4, above.

Example 15

Example 15 was prepared and characterized as described for Example 14, except that the Pt and Ni deposition process was modified such that the Pt areal loadings were about 21 micrograms/cm² and the areal Ni loadings were about 10 micrograms/cm². The areal Ir content was similar to Example 14, about 11 micrograms/cm². Example 15 was evaluated for durability with the AST. The results are provided in Tables 3-5, above.

Comparative Example N

Comparative Example N prepared and characterized as described for Example 14, except that no Ir was deposited. Comparative Example N was evaluated for durability with the AST. The results are provided in Tables 3-5, above.

Comparative Example O

Comparative Example O prepared and characterized as described for Example 14, except that the Ir was deposited onto the surface of the multiple alternating Pt and Ni layers, and the Ir deposition process was modified to deposit about 5 micrograms/cm² of Ir. Comparative Example O was evaluated for durability with the AST. The results are provided in Tables 3-5, above.

Figure 3:
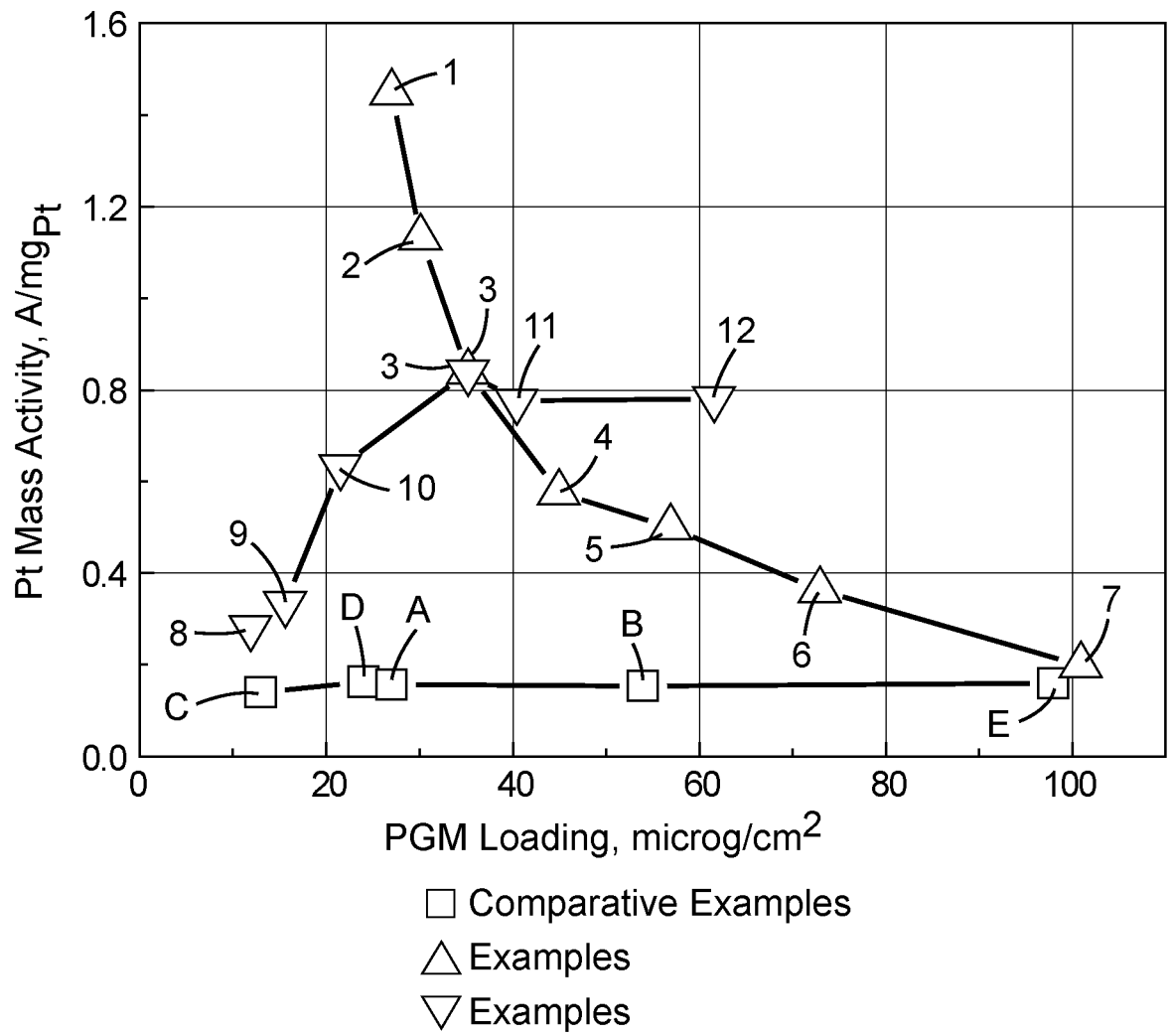
FIG. 3 is a plot of the electrocatalyst mass activity as a function of catalyst loading of Examples 1-12 and Comparative Examples A-E catalysts, normalized to platinum content.

FIG. 3 and Table 3, above, summarizes the Pt mass activities for Comparative Examples A-E and Examples 1-12 as a function of total PGM (Pt+Ir) areal loading. Comparative Examples A-E did not include an Ir underlayer. Examples 1-12 did include Ir underlayers directly on the microstructured whiskers.

The Pt mass activities of Comparative Examples A-E range from 0.14 to 0.16 A/mg and were relatively independent of Pt areal loading between 13 and 98 micrograms/cm².

The Pt mass activities of Examples 1-7 and 8-12 are higher than the Comparative Examples over a similar PGM areal loading range. With Example 1-7 (varying amounts of Pt on fixed Ir underlayer loading), the Pt mass activity increased from 0.20 to 1.45 A/mg$_{Pt}$ as the Pt areal loading decreased from about 75 to 1.1 to micrograms/cm². The maximum Pt mass activity, obtained with Example 1, was about 10× higher than Pt.

The Pt mass activities of Examples 8-12 (fixed amount of Pt on variable Ir underlayer loadings) range from 0.28 to 0.84 A/mg$_{Pt}$ as the Ir areal loading increased from 1.7 to 35 microgram/cm², and the Pt mass activity did not change appreciably as the Ir content was further increased to 52 micrograms/cm². The maximum Pt mass activity, obtained from Examples 10-12, are approximately 5× higher than pure Pt.

Figure 4:
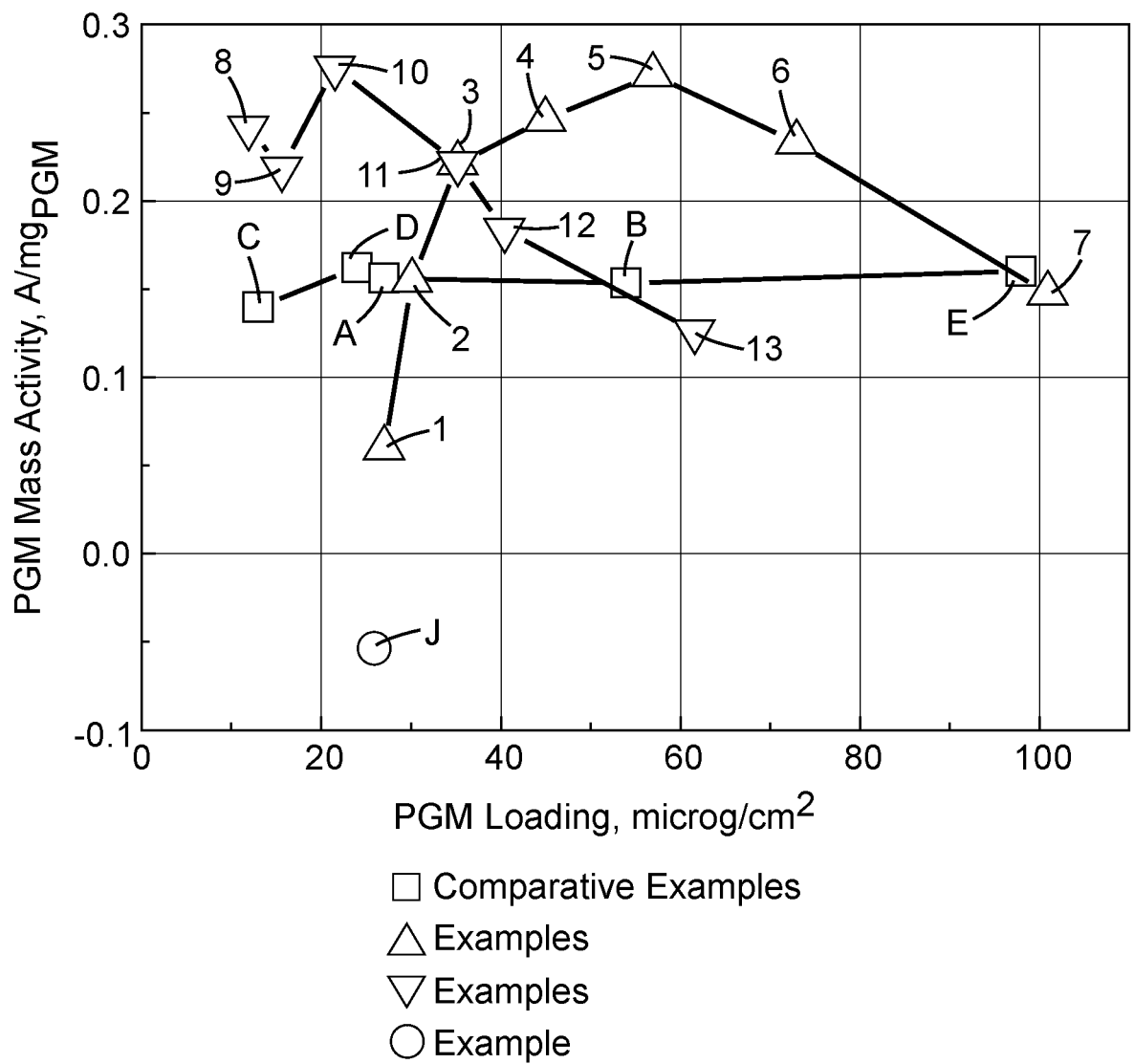
FIG. 4 is a plot of the electrocatalyst mass activity as a function of catalyst loading of Examples 1-12, Comparative Examples A-E and J catalysts, normalized to the sum of the platinum and iridium content.

Since iridium is a precious metal, it is also conventional to compare the mass activity on a total PGM content basis. FIG. 4 and Table 3, above, summarizes the PGM mass activities for Comparative Examples A-E, Comparative Example J, Examples 1-7, and Examples 8-12 as a function of total PGM (Pt+Ir) areal loading. Comparative Examples A-E do not include an Ir underlayer. Examples 1-12 did include Ir underlayers. Comparative Example J did not include Pt. The PGM mass activities of Examples 1-7 range from 0.06 to 0.27 A/mg$_{PGM}$ as the Pt areal loading was increased from 1.1 to 31 micrograms/cm², and then decreases to 0.15 A/mg$_{PGM}$ as the Pt areal loading was increased further to 75 micrograms/cm². The PGM mass activity of Examples 2 and 7 were comparable to pure Pt, and enhanced mass activity is obtained through the intermediate Pt areal loading range, indicating an optimal Pt:Ir ratio or a combination of optimal Pt thicknesses for this Ir thickness. Comparative Example J, pure Ir, yielded a PGM mass activity of −0.05A/mg, which indicated that at 0.90V, parasitic losses, such as electronic shorting, are larger than the oxygen reduction current density.

Figure 5:
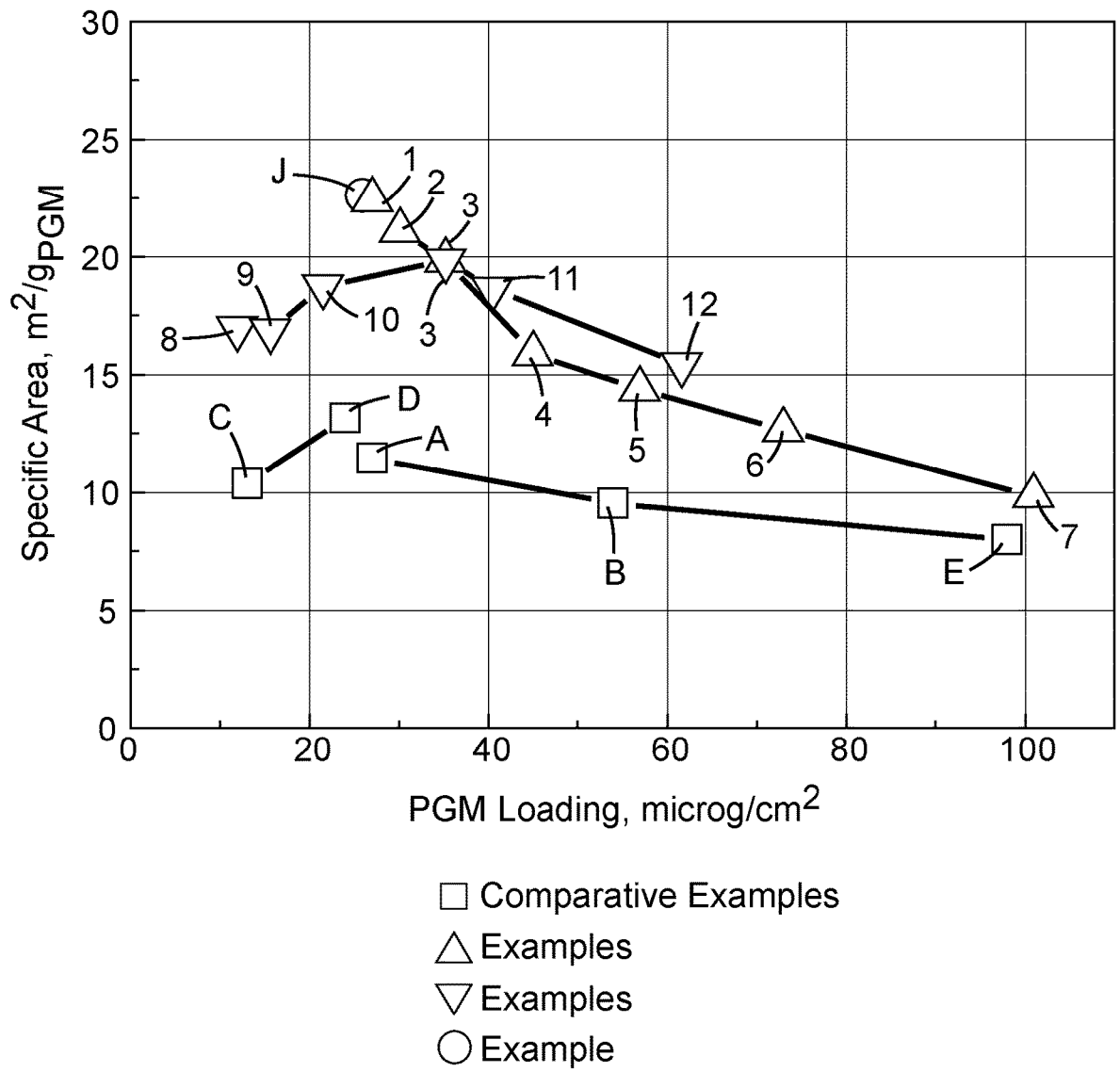
FIG. 5 is a plot of the electrocatalyst specific surface area as a function of catalyst loading of Examples 1-12, Comparative Examples A-E and J catalysts, normalized to the sum of the platinum and iridium content.

FIG. 5 and Table 3, above, compared the specific areas of Comparative Examples A-E, Comparative Example J, and Examples 1-12 as a function of total PGM (Pt+Ir) areal loading.

The specific area of pure Pt increased from 8.0 to 13.2 m²/g as the Pt loading decreased from 98 to 24 micrograms/cm², consistent in trend with expectation as the thickness of the Pt thin film on the support decreases. However, as the Pt areal loading decreased further to 13 micrograms/cm², the area decreased to 10.4 m²/g, likely due to instability of the thin film leading to catalyst dewetting from the support. This is suggestive that there may be a critical minimum areal loading (thickness) for thin film stability, between 13 and 24 micrograms/cm² for Pt catalyst.

In contrast, the specific area of the Pt/Ir samples was generally appreciably higher than the pure Pt catalyst. With Examples 1-7, the specific area increased monotonically from 9.9 to 22.4 m²/g as the Pt content decreased from 75 to 1.1 micrograms/cm². The specific area of pure Ir (Comparative Example J), was 22.6 m²/g, similar to the specific area of Example 1.

With Examples 8-12, the specific area ranged from 17.0 to 15.4 m²/g as Ir content varied from 1.1 to 52 micrograms/cm², all higher than pure Pt over similar total PGM loading ranges. Surprisingly, incorporation of just 1.7 microgram/cm² of Ir (about 0.05 nm thick on the support, which is much less than a monolayer (about 0.2 nm)) yielded a strong enhancement in area over pure Pt. Without being bound by theory, this result suggests that the Ir is acting as a stable anchor between the PR149 support and the overlying Pt, diminishing the extent of dewetting.

Intrinsically, the specific surface area of the catalyst on the support depends on the thickness of the catalyst on the support, the support surface area over which the catalyst is wetted, and intrinsic roughness of the catalyst. As such, the specific surface area should also be assessed as a function of catalyst thickness on the support. The thickness on support is a fundamental characteristic of the catalyst, which in part is essential to the determined specific surface area.

Figure 6:
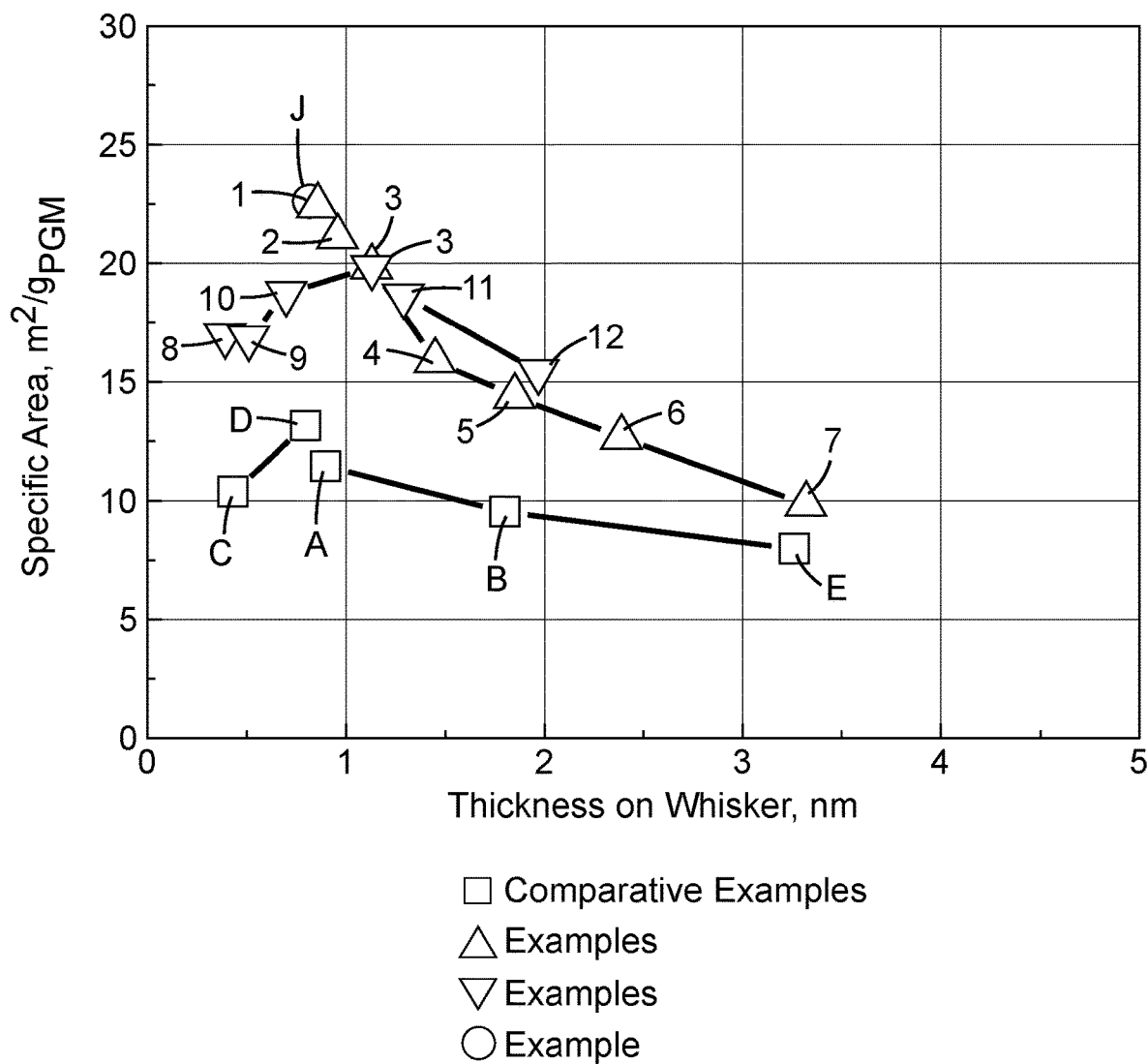
FIG. 6 is a plot of the electrocatalyst specific surface area as a function of catalyst thickness on support whisker of Examples 1-12, Comparative Examples A-E and J catalysts, normalized to the sum of the platinum and iridium content.

FIG. 6 summarizes the specific surface areas of Comparative Examples A-E, Examples 1-7, and Examples 8-12, plotted as a function of thickness on the support, as calculated in Table 1, above. The specific area trends with thickness are similar to the specific area trends with areal PGM loading shown in FIG. 5. The modest differences between FIGS. 5 and 6 is because the thickness on support relates to the areal PGM loading via the density constituent elements, which is slightly different for Pt vs. Ir (21.45 vs. 22.56 g/cm³), and although not wanting to be bound by theory, it is believed that it was due to the absolute areal loading of the constituent elements.

Table 6, below, summarizes the percentage increase in specific area of Examples 1-12, relative to Comparative Examples A-E, at the same catalyst thickness on whisker support.

TABLE 6

| Sample | Measured Specific Area, m²/g | Estimated Thickness on Support, nm | Interpolated Specific Area of Pt, m²/g | Specific Area Increase vs. Pt Only, % |
|---|---|---|---|---|
| Comparative Example C | 10.4 | 0.43 | 10.4 | 0 |
| Comparative Example D | 13.2 | 0.80 | 13.2 | 0 |
| Comparative Example A | 11.4 | 0.90 | 11.4 | 0 |
| Comparative Example B | 9.5 | 1.80 | 9.5 | 0 |
| Comparative Example E | 8.0 | 3.26 | 8.0 | 0 |
| Example 1 | 22.4 | 0.86 | 12.2 | 84.5 |
| Example 2 | 21.1 | 0.96 | 11.3 | 86.5 |
| Example 3 | 19.9 | 1.13 | 11.0 | 81.3 |
| Example 4 | 15.9 | 1.45 | 10.3 | 54.9 |
| Example 5 | 14.4 | 1.85 | 9.5 | 52.0 |
| Example 6 | 12.7 | 2.39 | 8.9 | 42.2 |
| Example 7 | 9.9 | 3.32 | 7.9 | 24.3 |
| Example 8 | 17.0 | 0.39 | 10.1 | 68.5 |
| Example 9 | 16.9 | 0.51 | 11.0 | 53.8 |
| Example 10 | 18.7 | 0.70 | 12.4 | 51.2 |
| Example 11 | 18.6 | 1.29 | 10.6 | 75.8 |
| Example 12 | 15.4 | 1.97 | 9.3 | 65.3 |

Comparative Example data was not available at the precise thicknesses on support as the Examples. Using the Comparative Examples A-E data, linear interpolation and extrapolation was used to estimate the specific surface areas at the specific thicknesses of the Examples 1-12. For example, the Pt+Ir thickness on support for Example 1 was 0.86 nm and the measured specific area was 22.4 m²/g. The Pt thicknesses for Comparative Examples D and A (which do not contain Ir) were 0.80 and 0.90, respectively, and the associated specific areas were 13.2 and 11.4 m²/g, respectively. Using linear interpolation, the estimated specific area of the Comparative Example at 0.86 nm thickness was estimated as 12.2 m²/g. The specific area of Example 1 was 84.5% higher than that estimated for Pt only at the same thickness on support ((22.4−12.2)/12.2*100%). Analogous analyses were conducted for the Comparative Examples A-E and Examples 1-12 data. The specific areas of the Examples 1-12 ranged from 24.3 to 84.5% higher than Comparative Examples A-E on a thickness basis.

Figure 7:
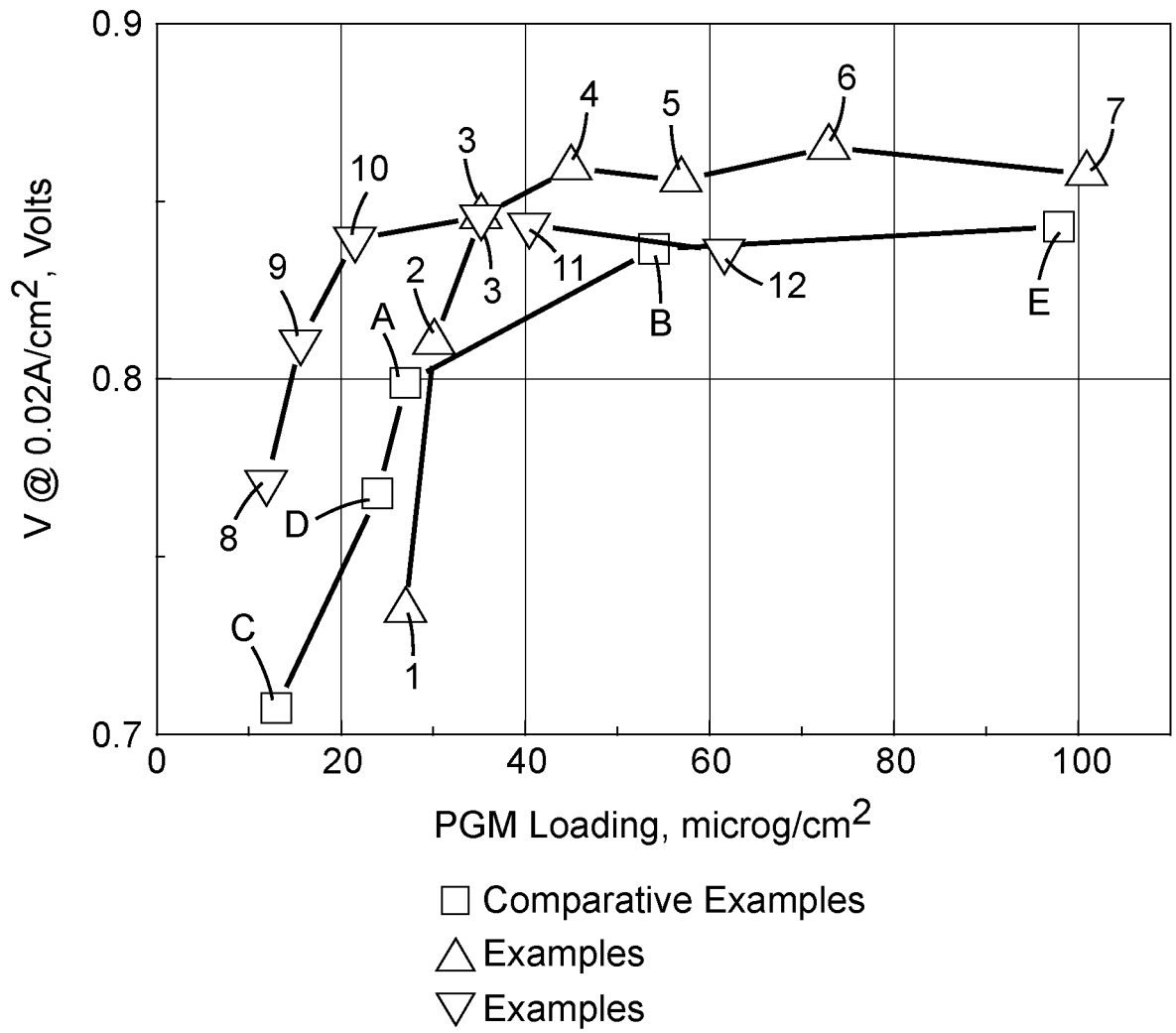
FIG. 7 is a plot of the cell voltage at 0.02 A/cm² current density as a function of catalyst loading of Examples 1-12 and Comparative Examples A-E.

FIG. 7 and Table 4, above, summarize the cell voltage measured at 0.02 A/cm² current density for Comparative Examples A-E and Examples 1-12. Examples 2-11 generated higher cell voltage than the Comparative Examples at similar PGM areal loadings. Examples 1-12 also generated cell voltages higher than Comparative Example J (pure Ir), which produced a cell voltage of only about 0.55 V (not shown in FIG. 7).

Figure 8:
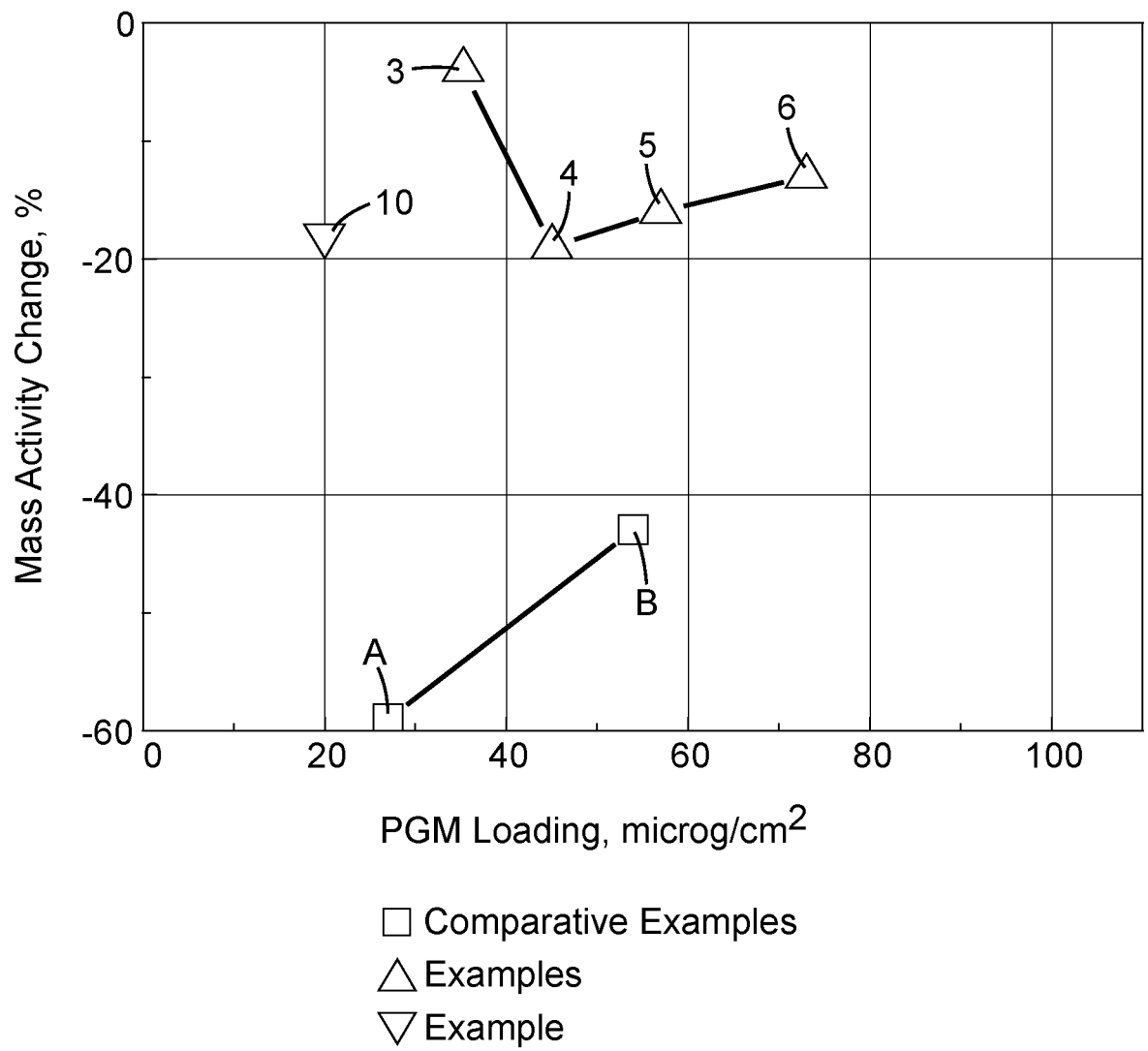
FIG. 8 is a plot of the change in electrocatalyst mass activity after an accelerated durability test as a function of catalyst loading of Examples 3-6 and 10, and Comparative Examples A and B.

Table 5, above, and FIG. 8 summarize the changes in mass activity after an electrochemical accelerated durability test of the Examples 3-6 and 10, and Comparative Examples A and B. Under this test, the catalyst was cycled 30,000 times between 0.60-1.00 V, an approximate representation of a fuel cell drive cycle. The mass activity changes of Examples 3-6 and Example 10 ranged from −4 to −19%, smaller than the −43 to −59% changes observed with Comparative Examples A and B.

Table 5, above, also summarizes the changes in specific area and specific activity after the AST. The specific area changes of Examples 3-6 and 10 ranged from +3 to −12%, smaller than the changes of Comparative Examples A and B, −30 to −39%. The specific activity changes of Examples 3-6 and 10 ranged from +6 to −8%, smaller than the −18 to −33% changes of Comparative Examples A and B.

Figure 9:
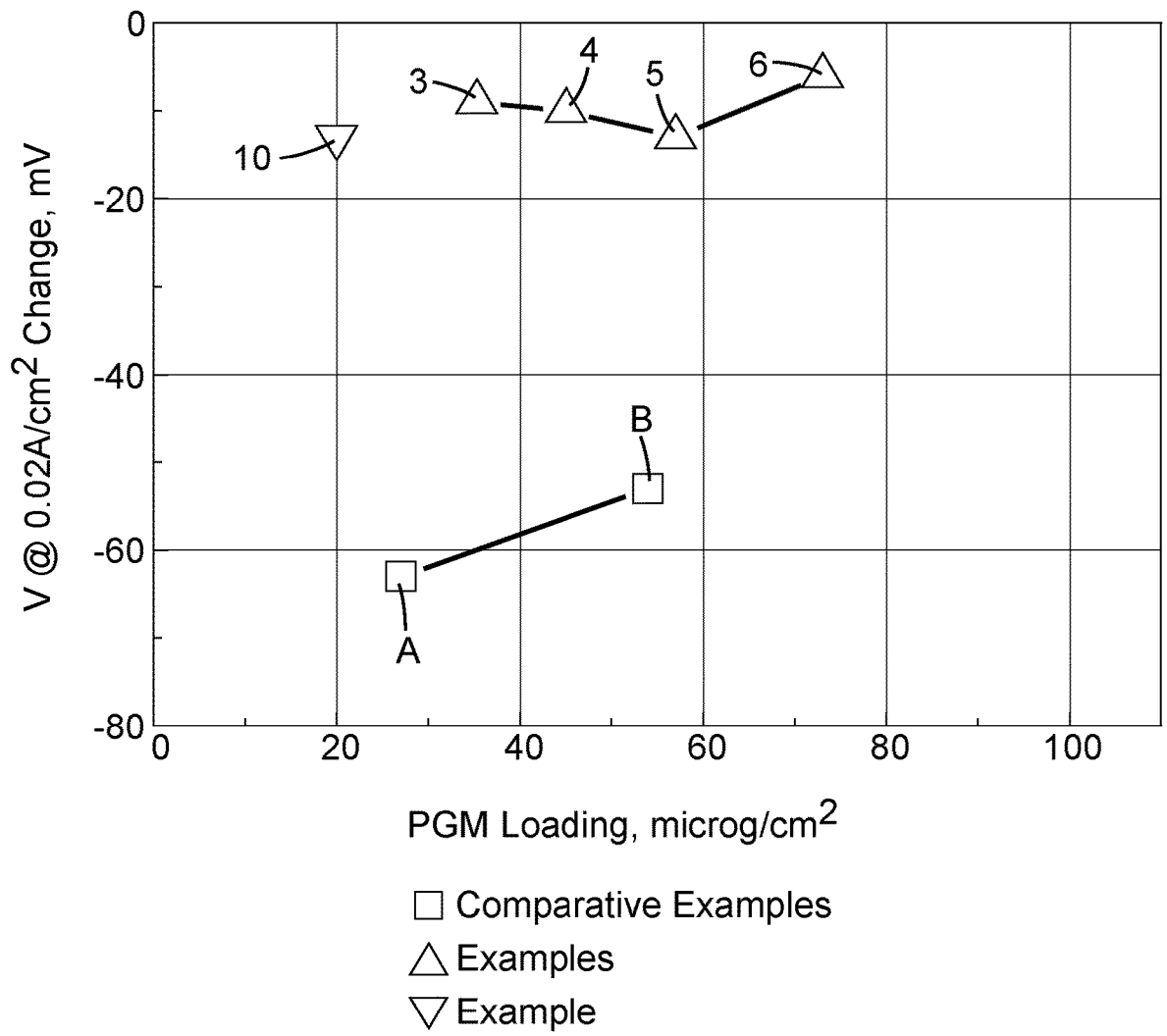
FIG. 9 is a plot of the change in cell voltage at 0.02 A/cm² after an accelerated durability test as a function of catalyst loading of Examples 3-6 and 10, and Comparative Examples A and B.
Figure 10:
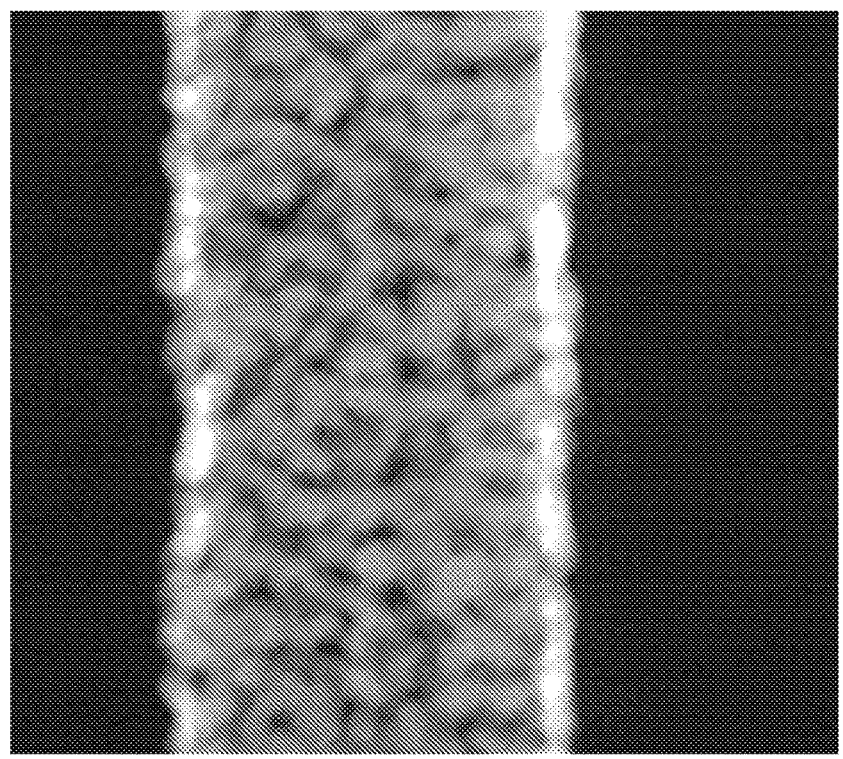
FIG. 10 is a High Angle Annular Dark Field Transmission Electron Micrograph of Example 10 catalyst at 1,000,000× magnification, after deposition of the catalyst onto the optional support whisker.

Table 5, above, and FIG. 9 summarize the changes in cell voltage at 0.02 A/cm² current density after the durability test for Examples 3-6 and 10, and Comparative Examples A and B. The changes were smaller for Examples 3-6 and 10 (−6 to −13 mV) than Comparative Examples A and B, which changed −53 to −63 mV.

Table 5, above, also summarizes changes in cell voltage at 0.32 A/cm² and percentage changes in current density at 0.50 V cell voltage. Examples 3-6 and Example 10 lost between 4 and 36 mV at 0.32 A/cm², as compared to 189 to 160 mV losses for Comparative Examples A and B. At 0.50 V cell voltage, the changes in current density for Examples 3-6 and 10 ranged from −4 to +9%, as compared to 67% losses for both Comparative Examples A and B.

As noted in Table 5 (above) and FIGS. 8 and 9, the Ir underlayer yielded durability improvements over the Comparative Examples. FIGS. 10-17 indicate this Pt on Ir structure, formed by deposition of a layer comprising Pt onto a layer comprising Ir, was maintained after electrochemical cycling, such as in a fuel cell. Without being bound by theory, it is believed that the Ir underlayer adhered to the whisker support more strongly than Pt adhered to the whisker support, and the Pt adhered more strongly to the Ir than Pt adhered to the whisker support. These differences in Pt-whisker, Ir-whisker, and Pt—Ir adhesion energies are believed to promote enhanced structural stability.

Figure 11:
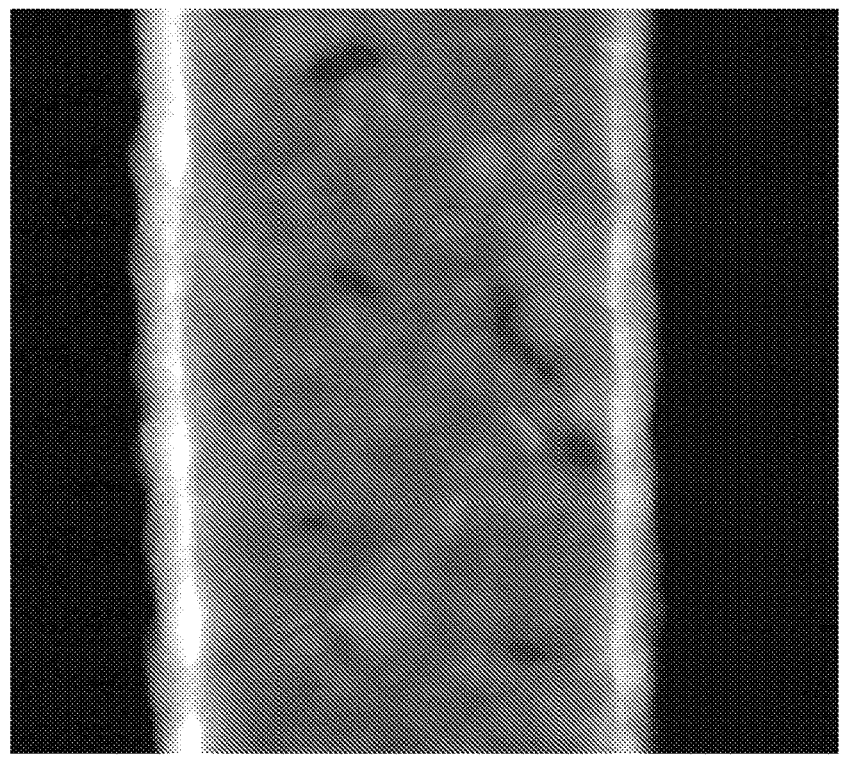
FIG. 11 is a High Angle Annular Dark Field Transmission Electron Micrograph of Example 10 catalyst at 1,000,000× magnification, after annealing the catalyst.
Figure 12:
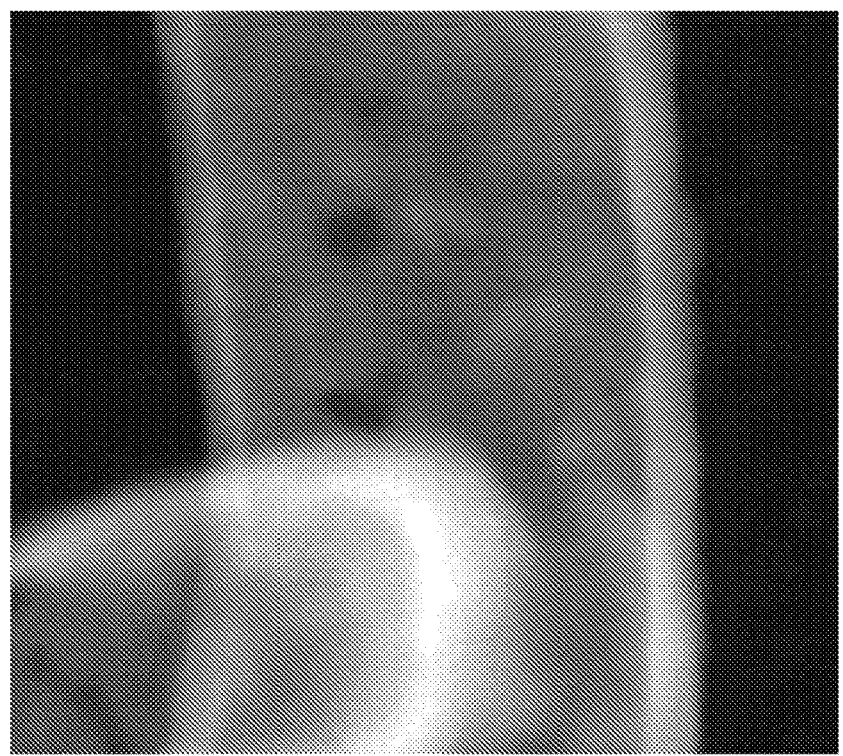
FIG. 12 is a High Angle Annular Dark Field Transmission Electron Micrograph of Example 10 catalyst at 1,000,000× magnification, after testing the catalyst in fuel cell.
Figure 13:
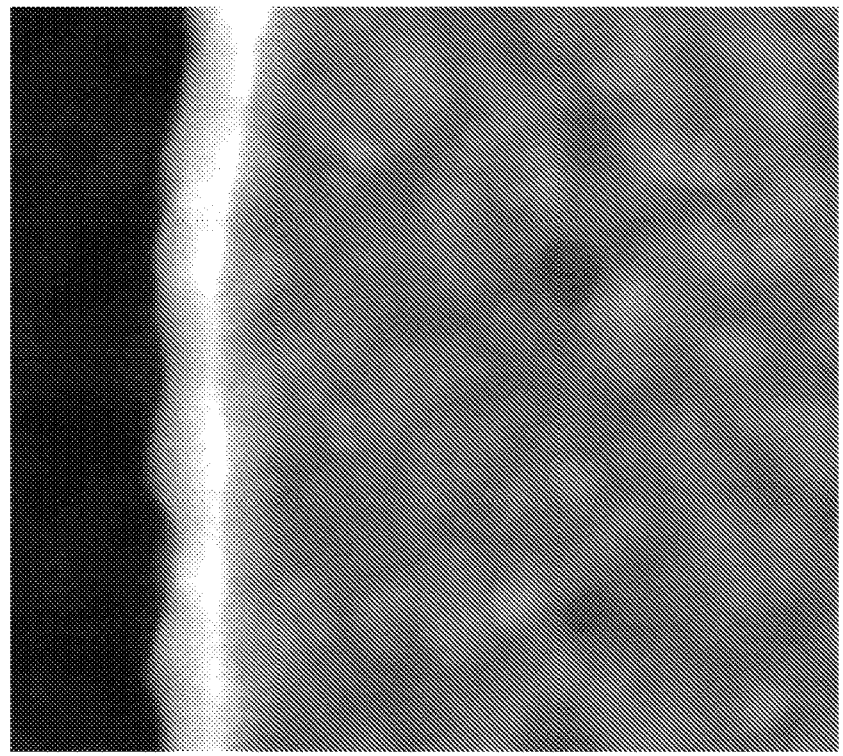
FIG. 13 is a High Angle Annular Dark Field Transmission Electron Micrograph of Example 10 catalyst at 1,000,000× magnification, after accelerated durability testing the catalyst in fuel cell.
Figure 14:
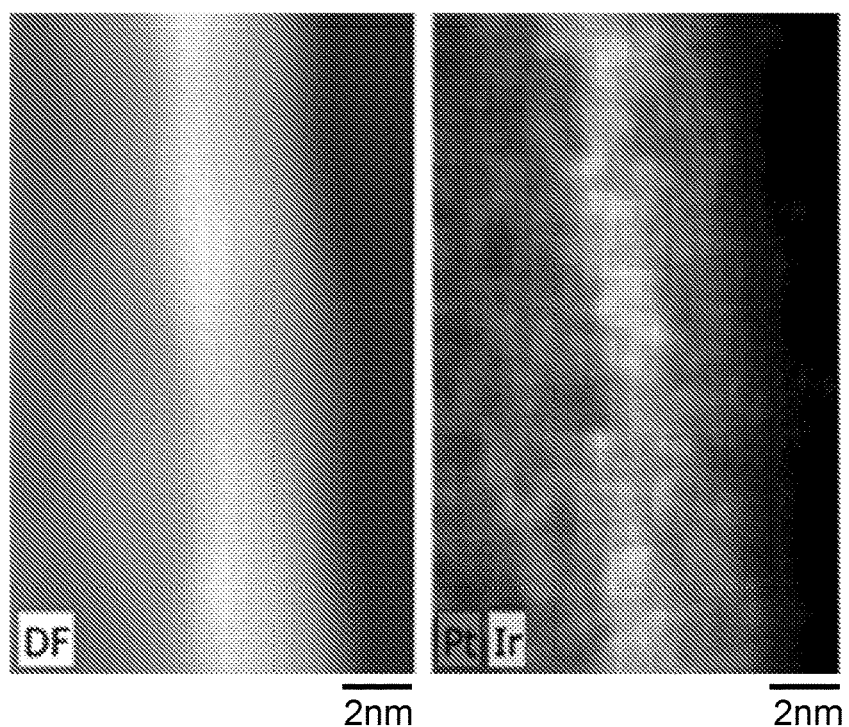
FIG. 14 is a High Angle Annular Dark Field Transmission Electron Micrograph and Energy Dispersive X-Ray Spectroscopy elemental map for Example 10 catalyst at 3,000,000× magnification, after deposition of the catalyst onto the optional support whisker.
Figure 15:
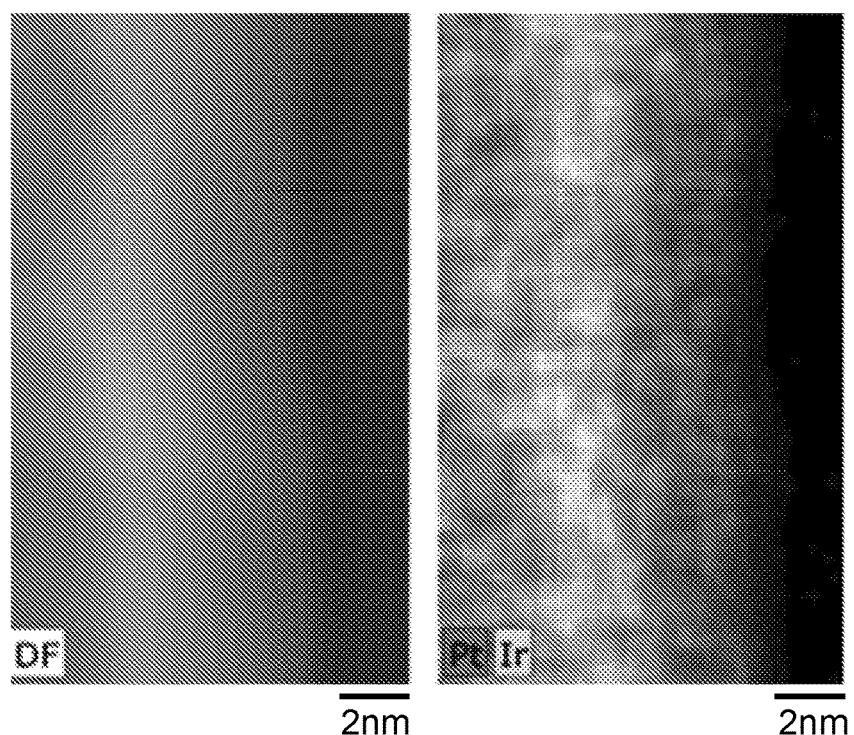
FIG. 15 is a High Angle Annular Dark Field Transmission Electron Micrograph and Energy Dispersive X-Ray Spectroscopy elemental map for Example 10 catalyst at 3,000,000× magnification, after annealing the catalyst.
Figure 16:
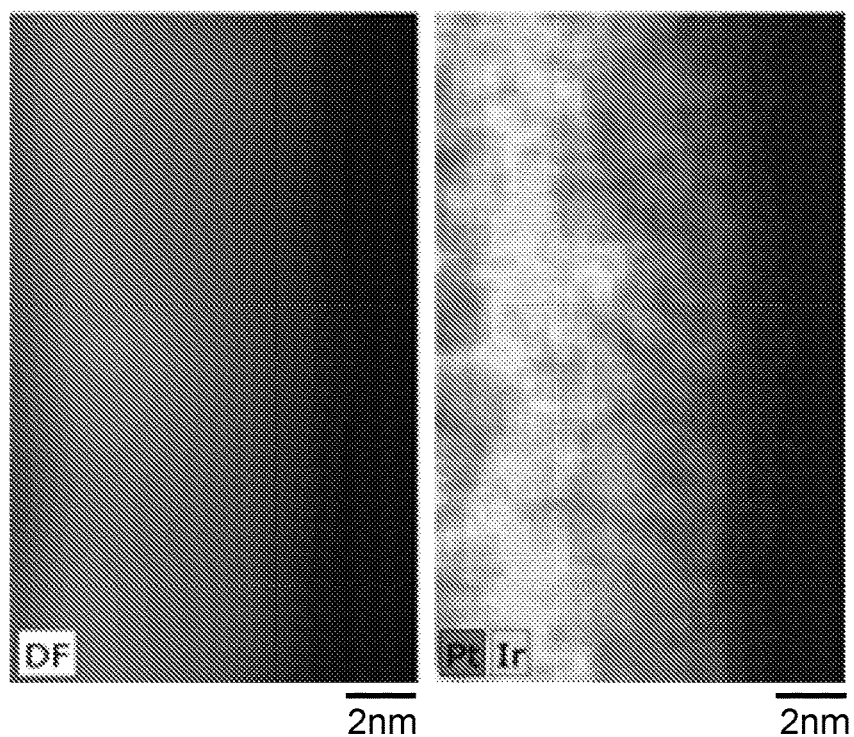
FIG. 16 is a High Angle Annular Dark Field Transmission Electron Micrograph and Energy Dispersive X-Ray Spectroscopy elemental map for Example 10 catalyst at 3,000,000× magnification, after testing the catalyst in fuel cell.

Transmission Electron Microscopy (TEM) analysis was conducted on Example 10 catalyst to determine the distribution the catalyst structure on the whisker support. The analysis was conducted at four different states, after deposition (FIG. 10), after annealing (FIG. 11), after fuel cell testing (FIG. 12), and after accelerated durability testing (FIG. 13). FIGS. 10-13 each show the structure of a portion of one or two catalyst-coated whiskers. Brighter regions have a higher density of catalyst than dimmer regions. As deposited (FIG. 10), the catalyst morphology consists of a discontinuous 2-4 nm thick coating on the whisker support, of partially fused metal catalyst grains. After annealing (FIG. 11), many of the grains have fused, forming a largely, but not completely, continuous 2-4 nm thick coating of catalyst metal on the whisker support. After fuel cell testing (FIG. 12) and durability testing (FIG. 13), further grain coalescence occurred.

Figure 17:
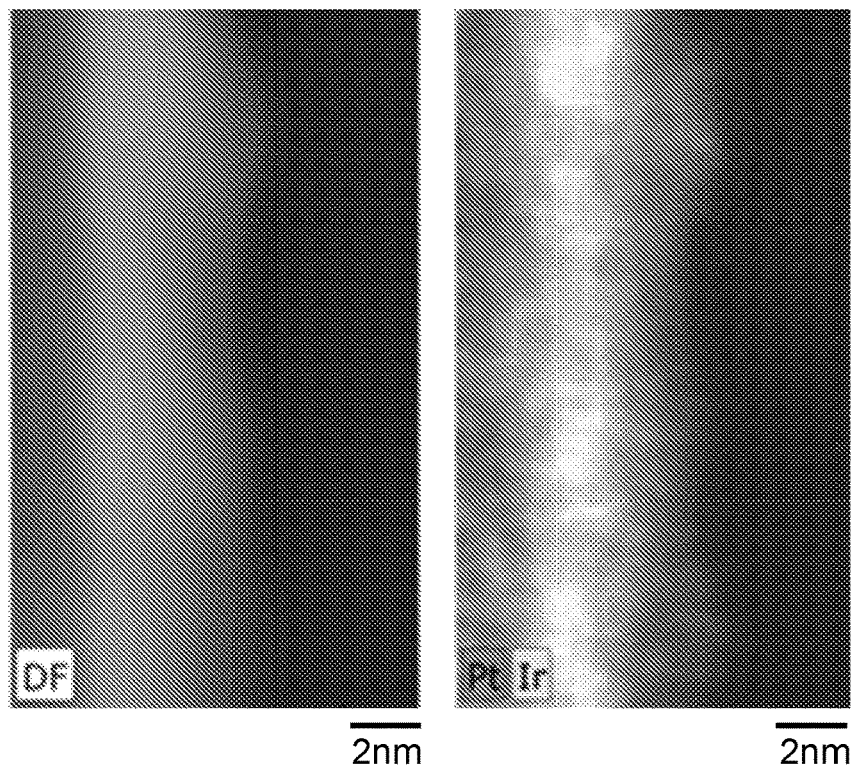
FIG. 17 is a High Angle Annular Dark Field Transmission Electron Micrograph and Energy Dispersive X-Ray Spectroscopy elemental map for Example 10 catalyst at 3,000,000× magnification, after accelerated durability testing the catalyst in fuel cell.

Transmission Electron Microscopy (TEM) and Energy Dispersive X-Ray Spectroscopy (EDS) analysis was conducted on Example 10 catalyst to determine the distribution of Pt and Ir on the whisker support. The analysis was conducted at four different states, after deposition (FIG. 14), after annealing (FIG. 15), after fuel cell testing (FIG. 16), and after accelerated durability testing (FIG. 17). The left image of each FIG. is a darkfield TEM image, and the right image of each FIG. is the EDS-determine composition map over the same spatial region as the left image. The images show a portion of the catalyst on a single whisker support. The EDS analyses shows that in all states, the surface consisted essentially of a pure Pt or Pt-rich surface layer, about 1-2 nm thick, on top of 1-2 nm thick Ir or Ir-rich layer underneath. After durability testing, a few Ir-rich regions were observed at the surface, on-top of the Pt layer.

Figure 18:
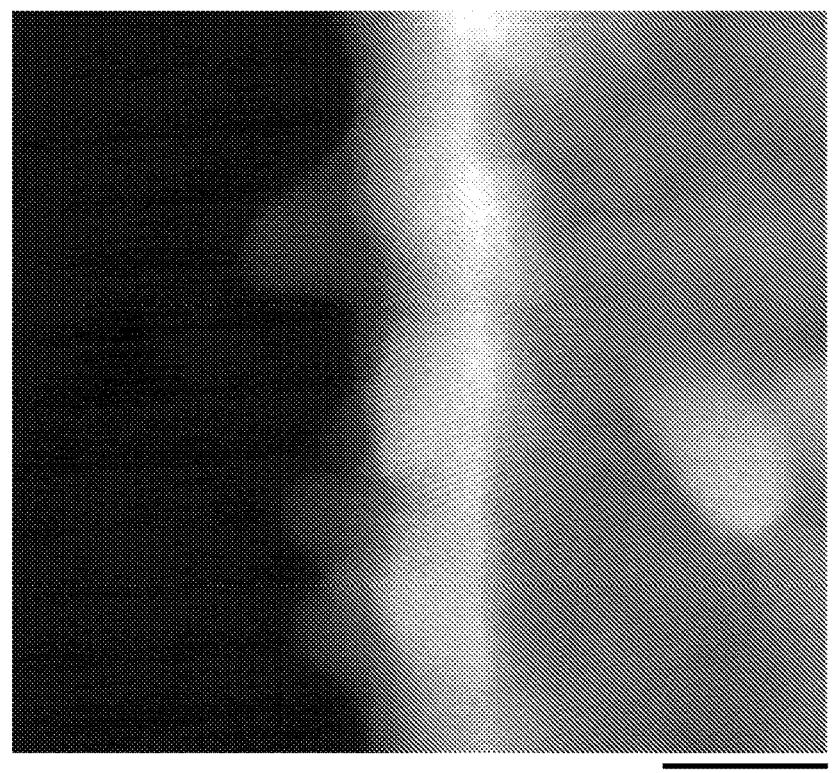
FIG. 18 is a High Angle Annular Dark Field Transmission Electron Micrograph of Example 3 catalyst at 3,000,000× magnification, after accelerated durability testing the catalyst in fuel cell.
Figure 19:
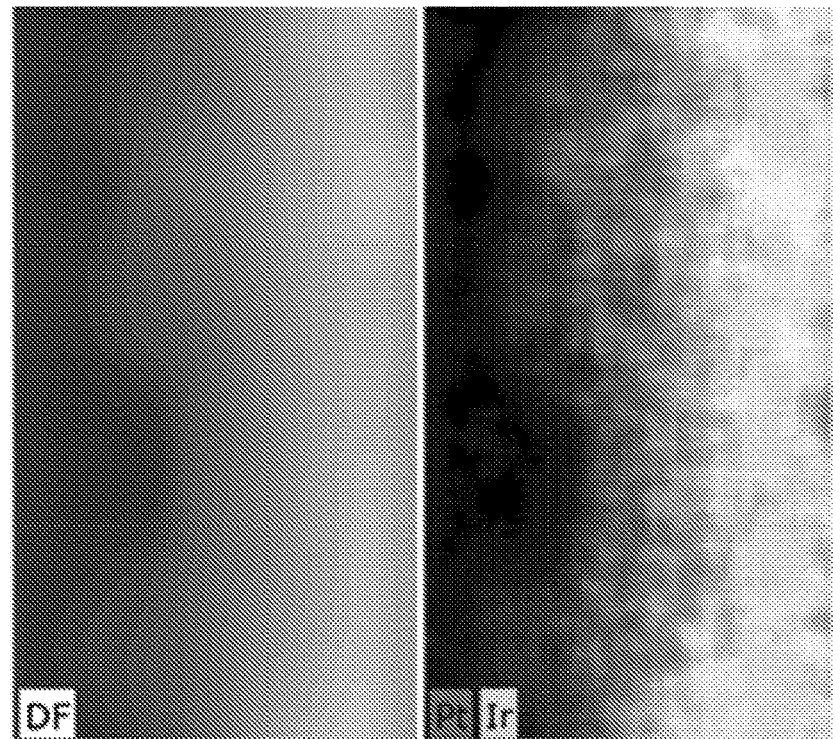
FIG. 19 is a High Angle Annular Dark Field Transmission Electron Micrograph and Energy Dispersive X-Ray Spectroscopy elemental map for Example 3 catalyst at 3,000,000× magnification, after accelerated durability testing the catalyst in fuel cell.

TEM and EDS analyses were also conducted on Example 3, which had a thicker Ir underlayer containing 26 micrograms per $cm^2$ of Ir than Example 10, which had 12 micrograms Ir per $cm^2$. FIG. 18 shows a TEM image after durability testing. FIG. 19 shows a darkfield TEM image and matching EDS composition map. After durability testing, FIG. 18 shows the presence of elongated crystalline grains extending from the surface. The diameters of the grains range from 3-8 nm. Some grains are spherical, whereas others are elongated. FIG. 19 shows that these surface grains are Ir or Ir-rich.

Figure 20:
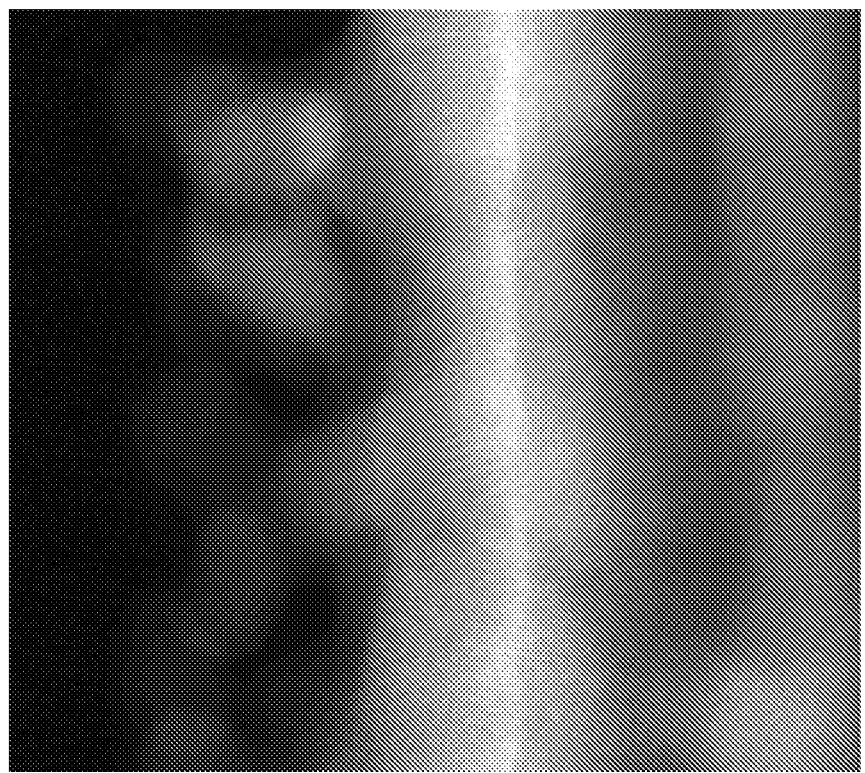
FIG. 20 is a High Angle Annular Dark Field Transmission Electron Micrograph of Example 2 catalyst at 3,000,000× magnification, after testing the catalyst in fuel cell.

FIG. 20 summarizes TEM images of Example 2 catalyst on whisker support, after fuel cell testing. The Example 2 catalyst had an about 5-10 nm thick continuous catalyst thin film and grains extending from the catalyst thin film surface. The surface grains had dimensions ranged from about 3 to 8 nanometers.

Based on the TEM and EDS analyses shown in FIGS. 10-20, the Ir-rich surface grains formed after electrochemical potential cycling. The surface grains on the thin film catalyst provide higher catalyst surface area than thin film catalyst alone. Without being bound by theory, the Ir-rich surface grains may form during potential cycling due to differences in resistance to electrochemical dissolution between Pt and Ir.

As shown in Table 3, above, pure Ir (Comparative Example J) did not have measurable activity for oxygen reduction at 0.900V. Surprisingly, the catalysts of the Examples, which may have regions of Ir-rich surface grains covering the Pt catalyst, had enhanced Pt mass activity over pure Pt catalysts. Without being bound by theory, it is believed that the Ir-rich surface grains may also comprise a thin, sub-nm thick layer of Pt. Such a thin Pt layer was not reliably detectable by EDS. Without being bound by theory, it is believed that a sub-nm Pt layer on an Ir-rich surface grain would have higher Pt mass activity than an analogous Pt layer on a planar Ir layer, due to higher specific surface area.

Figure 21:
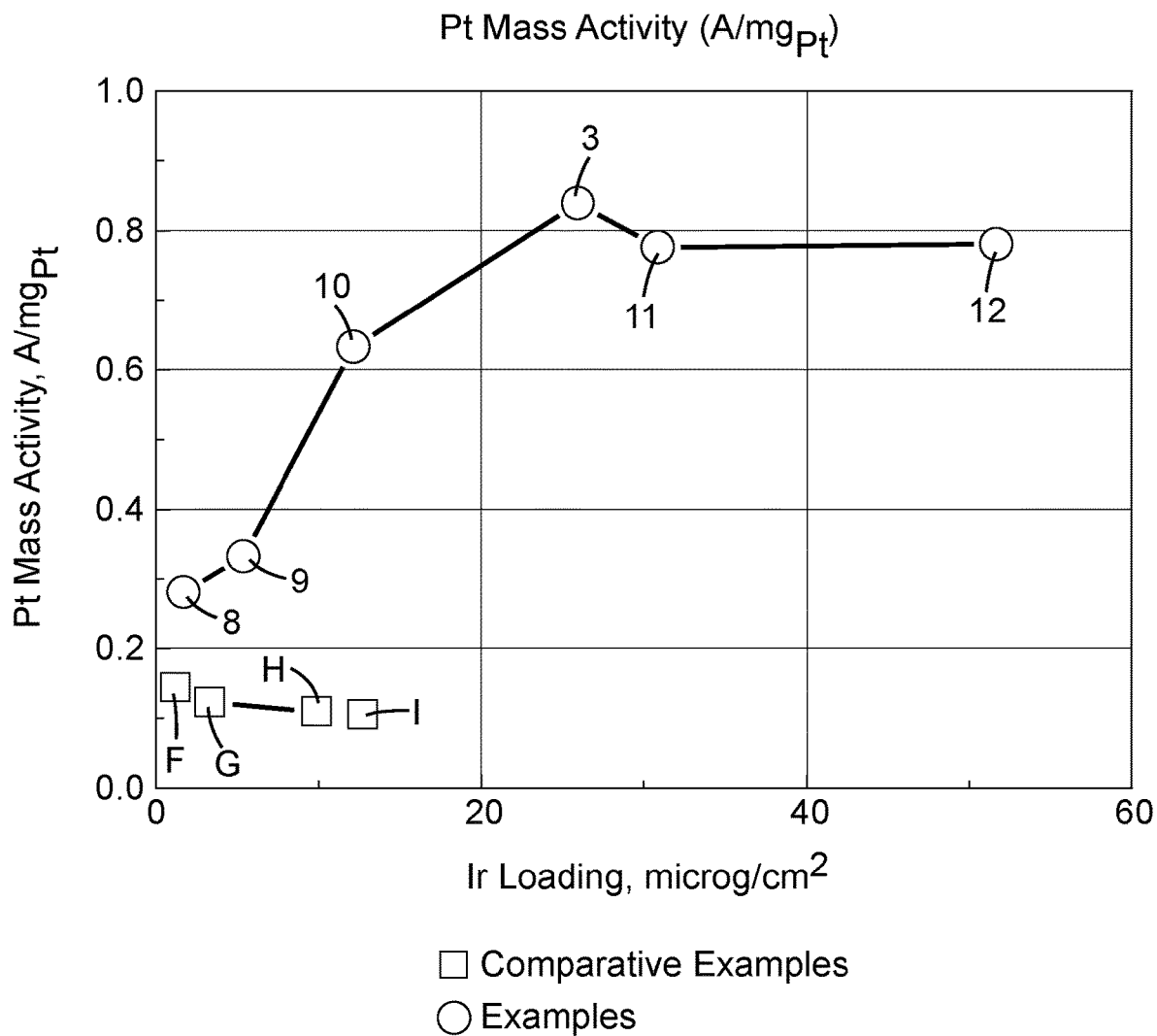
FIG. 21 is a plot of the electrocatalyst mass activity as a function of catalyst loading of Examples 3 and 8-12, and Comparative Examples F-I catalysts, normalized to platinum content.

Table 3, above, and FIG. 21 summarize the Pt mass activity of Comparative Examples F-I and Examples 3 and 8-12, which contained Pt and Ir in different structures. Comparative Examples F-I comprised varying areal loadings of Ir on top of a Pt layer with fixed areal loading, and Examples 3 and 8-12 comprised varying areal loadings of Ir below a Pt layer with fixed areal loading. The Pt mass activities of Comparative Examples F-I ranged from 0.14 to 0.10 A/mg. The Pt mass activities of Examples 3 and 8-12 were higher than Comparative Examples F-I, and ranged from 0.28 to 0.84 A/mg. The higher mass activity of the Examples 3 and 8-12 catalysts than the Comparative Examples F-I catalysts was in part due to higher specific surface area, as shown in Table 3, above.

Table 3, above, summarizes the mass activity, specific area, and specific activity of Example 10 and Comparative Examples K and L. Example 10 comprised 9 micrograms Pt per $cm^2$ on an Ir underlayer with 12 micrograms Ir per $cm^2$. Comparative Example K comprised 14 micrograms Ir per $cm^2$ on a Pt underlayer with 14 micrograms of Pt per $cm^2$. Comparative Example L comprised the same amounts of Pt and Ir as Comparative Example K, but the Pt and Ir were deposited as multiple alternating thin layers to enable formation of a PtIr alloy. The Pt mass activities and specific surface areas of Example 10, Comparative Example K, and Comparative Example L were 0.63, 0.52, and 0.59 A/mg and 18.7, 16.8, and 16.9 $m^2/g$, respectively. The higher Pt mass activity of Example 10 than Comparative Examples K and L was due to higher specific surface area.

Table 3, above, summarizes the mass activity, specific area, and specific activity of Example 10 and Comparative Example M. Example 10 comprised an Ir underlayer and surface Pt catalyst, and Comparative Example M comprised an Au underlayer and surface Pt catalyst. Both Ir and Au were precious metals which are corrosion resistant. The Pt mass activity, specific area, and specific activity of Example 10 was 0.63 A/mg, 18.7 $m^2/g$, and 1.47 $mA/cm^2$, respectively, higher than the 0.004 A/mg, 0.2 $m^2/g$, and 0.33 $mA/cm^2$ obtained with Comparative Example M. Without being bound by theory, it is believed that Pt, Ir, and Au may have had surface segregation energies, which are a measure of the thermodynamic stable configuration in multi-metallic systems. These energies depend upon the electrochemical environment, including the electrode potential, the electrolyte and spectator species, and reactant species, such as oxygen. With the Pt and Au system in Comparative Example M, the thermodynamic stability of the catalyst configuration with Au at the surface of Pt may be energetically preferred over Pt at the surface of Au. Au does not have measurable ORR activity at 0.900 V in acidic electrolytes or electrochemically-measurable specific surface area by hydrogen adsorption and desorption.

Table 3, above, summarizes the mass activity of Examples 3 and 13 (Pt with Ir underlayer) and Comparative Examples A-E (pure Pt). Example 13 had the same composition and fabrication process as Example 3, except that Example 13 was not annealed. The Comparative Examples A-E were not annealed. The Pt mass activities of Example 3 and Example 13 were 0.84 A/mg and 0.60 A/mg, respectively, and the Pt mass activities of Comparative Examples A-E ranged from 0.14-0.16 A/mg. Both annealed and unannealed Examples yielded higher mass activity than the Comparative Examples A-E, due to higher specific surface area. The annealed Example 3 catalyst's mass activity was higher than unannealed Example 13, due to higher specific activity (1.11 mA/cm² vs. 0.81 mA/cm²). As shown in FIGS. 11 and 12, annealing may have promoted improved wetting of the Pt onto the Ir. Without being bound by theory, it is believed that annealing may have promoted improved specific activity due to decreased Pt—Pt bond distances of the surface Pt atoms, and the oxygen reduction specific activity depended upon Pt—Pt bond distances.

Table 3, above, summarizes the Pt mass activity of Example 14 and Comparative Examples N and O. Example 14 comprised a surface layer comprising a PtNi alloy on an Ir underlayer. The areal Pt loading of Example 14 was 9 per cm². Comparative Example N comprised a similar PtNi alloy as Example 14 but without an Ir underlayer. Comparative Example O comprised a similar PtNi alloy with a surface Ir layer. The Pt mass activities of Example 14, Comparative Example N, and Comparative Example O were 0.89, 0.24, and 0.44 A/mg, respectively. The higher Pt mass activity of Example 14 was due in part to higher surface area. The specific surface area of Example 14 was 23 m²/g, which was 26.7% higher than Comparative Example N and 27.7% higher than Comparative Example O. The Ir underlayer was effective at increasing the activity of surface Pt alloys through increasing specific surface area.

Table 5, above, compares the changes in mass activity, specific area, specific activity, cell voltages at 0.02 and 0.32 A/cm², and cell current density at 0.50 V after accelerated durability testing for Example 15 and Comparative Examples N and O. Example 14 lost 24% mass activity after the durability test, as compared to 58 and 36% for Comparative Examples N and O. Ir present as an underlayer with a PtNi alloy surface catalyst yielded less mass activity loss than PtNi alloy catalyst alone or PtNi catalyst with a surface Ir layer.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A catalyst comprising an Ir layer having an outer layer with a layer comprising Pt directly thereon, wherein the Ir layer has an average thickness in a range from 0.04 to 30 nanometers, wherein the layer comprising Pt has an average thickness in a range from 0.04 to 50 nanometers, wherein the average thickness of the catalyst is the sum of the average thickness of the Ir layer and the average thickness of the layer comprising Pt, wherein the Pt and Ir are present in an atomic ratio in a range from 0.01:1 to 10:1, and wherein the catalyst further comprises nanoscopic metal crystallites extending from the surface of the catalyst.

2. The catalyst of claim 1, wherein the surface metal crystallites comprise at least 10 atomic % Ir.

3. The catalyst of claim 1, wherein the surface metal crystallites have a length in a range from 0.25 to 10 nanometers.

4. The catalyst of claim 1, wherein the surface metal crystallites have diameters in a range from 0.25 to 5 nanometers.

5. The catalyst of claim 1, wherein the layer comprising Pt further comprises Ni.

6. The catalyst of claim 5, wherein the Pt to Ni atomic ratio is in a range from 0.5:1 to 5:1.

7. An article comprising nanostructured elements comprising microstructured whiskers having an outer surface having the catalyst of claim 1 thereon.

8. The article of claim 7, wherein the microstructured whiskers are attached to a backing.

9. An article comprising the catalyst of claim 8.

10. The article according to claim 9 which comprises no electrically conductive carbon-based material.

11. A method of making the catalyst of claim 1, the method comprising depositing any of the layers via a deposition technique independently selected from the group consisting of sputtering, atomic layer deposition, metal organic chemical vapor deposition, molecular beam epitaxy, ion soft landing, thermal physical vapor deposition, vacuum deposition by electrospray ionization, and pulse laser deposition.

12. The method of claim 11, further comprising annealing at least one of the layers.

\* \* \* \* \*